US012533863B2

(12) United States Patent
Yamada

(10) Patent No.: US 12,533,863 B2
(45) Date of Patent: Jan. 27, 2026

(54) MOTION GENERATION DEVICE, PRESS DEVICE, AND MOTION GENERATION METHOD

(71) Applicant: KOMATSU INDUSTRIES CORPORATION, Kanazawa (JP)

(72) Inventor: Yukihiro Yamada, Ishikawa (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 505 days.

(21) Appl. No.: 18/006,931

(22) PCT Filed: Oct. 4, 2021

(86) PCT No.: PCT/JP2021/036605

§ 371 (c)(1),
(2) Date: Jan. 26, 2023

(87) PCT Pub. No.: WO2022/102279

PCT Pub. Date: May 19, 2022

(65) Prior Publication Data

US 2023/0347613 A1 Nov. 2, 2023

(30) Foreign Application Priority Data

Nov. 13, 2020 (JP) ................................ 2020-189873

(51) Int. Cl.
*B30B 1/26* (2006.01)
*B30B 15/14* (2006.01)

(52) U.S. Cl.
CPC ............ *B30B 1/266* (2013.01); *B30B 15/148* (2013.01)

(58) Field of Classification Search
CPC ..... B30B 1/266; B30B 15/146; B30B 15/148; B30B 15/20; B30B 15/26; B30B 15/32
See application file for complete search history.

(56) References Cited

U.S. PATENT DOCUMENTS

2003/0066332 A1 4/2003 Teraoka
2020/0041979 A1 2/2020 Yamada
(Continued)

FOREIGN PATENT DOCUMENTS

JP 2003-191096 A 7/2003
JP 2004-58152 A 2/2004
(Continued)

OTHER PUBLICATIONS

English translation of JP 2004058152 A, 17 pages, retrieved in 2025. (Year: 2025).*
(Continued)

*Primary Examiner* — Jimmy T Nguyen
(74) *Attorney, Agent, or Firm* — GLOBAL IP COUNSELORS, LLP

(57) ABSTRACT

A motion generation device is configured to generate motion of a slide of a press device including the slide to which an upper die is attached, a bolster on which a lower die is placed, and a servomotor configured to move the slide reciprocally in the up and down direction. The motion generation device includes a motion generation section. The motion generation section is configured to generate a derivative motion of the slide at a cycle time different from the cycle time of the standard motion of the slide, such that the derivative motion includes the same motion as a first region of the standard motion including at least from top dead center to the end position of the molding region, and the speed of the slide at top dead center of the derivative motion is the same as the speed of the standard motion.

6 Claims, 11 Drawing Sheets

(56) References Cited

U.S. PATENT DOCUMENTS

| | | | | |
|---|---|---|---|---|
| 2020/0061949 | A1* | 2/2020 | Okamoto | ............ B30B 15/0041 |
| 2020/0391469 | A1* | 12/2020 | Onishi | ...................... B30B 1/26 |
| 2021/0394477 | A1 | 12/2021 | Yamazaki | |

FOREIGN PATENT DOCUMENTS

| | | | | | |
|---|---|---|---|---|---|
| JP | 2005199326 | A | * | 7/2005 | ............. B21D 43/05 |
| JP | 2006-102767 | A | | 4/2006 | |
| JP | 2006-231415 | A | | 9/2006 | |
| JP | 2014-237157 | | | 12/2014 | |
| JP | 2018-94617 | | | 6/2018 | |
| JP | 6510873 | | | 4/2019 | |
| JP | 2020-131194 | A | | 8/2020 | |
| TW | 542783 | B | | 7/2003 | |

OTHER PUBLICATIONS

English translation of JP 2005199326 A, 12 pages, retrieved in 2025. (Year: 2025).*

The International Search Report for the corresponding international application No. PCT/JP2021/036605, issued on Dec. 14, 2021.

The Office Action for the corresponding Chinese application No. 202180055550.1, issued on Jan. 24, 2025.

* cited by examiner

MOTION GENERATION DEVICE, PRESS DEVICE, AND MOTION GENERATION METHOD

CROSS-REFERENCE TO RELATED APPLICATIONS

This application is a U.S. National stage application of International Application No. PCT/JP2021/036605, filed on Oct. 4, 2021. This U.S. National stage application claims priority under 35 U.S.C. § 119(a) to Japanese Patent Application No. 2020-189873, filed in Japan on Nov. 13, 2020, the entire contents of which are hereby incorporated herein by reference.

BACKGROUND

Technical Field

The present disclosure relates to a motion generation device, a press device, and a motion generation method.

Description of the Related Art

A tandem press line or a transfer press line has been used for pressing.

With a tandem press line, a plurality of press devices are installed side by side, and a feeder device (conveyor device) for conveying workpieces is provided between the press devices (see, for example, JP-A 2018-94617).

With a tandem press line, a phase difference is provided in the movements of the multiple press devices and the feeder device to avoid interference and to operate at the maximum speed. Also, with a transfer press line, a phase difference is provided in the movements of the press devices and the transfer device.

Also, with a press line, there are cases when control is performed so that the operating speed of the press line is reduced so as not to subject the feeder device to excessive impact during start-up, and the speed is gradually increased until a steady operating state is reached. In order to maintain good molding accuracy of the press device even in such a case, a technique has been disclosed in which the cycle time is varied while maintaining the motion of the slide in the molding region (see, for example, Japanese Patent No. 6,510,873).

SUMMARY

Meanwhile, there are cases in which it is desirable to operate a press line at a lower speed for reasons such as adjusting the production volume of pressed products.

In this case, in order to maintain molding accuracy, it is possible to reduce the speed of the press line by extending the cycle time while maintaining the motion of the molding region, as shown in Japanese Patent No. 6,510,873, but merely extending the cycle time to lower the operating speed of the press may cause interference between the press devices and the feeder device.

Eliminating this interference requires a major modification of the program for controlling not only the press devices but also the entire press system, including the feeder device.

It is an object of the present disclosure to provide a motion generation device, a press device, and a motion generation method with which the speed of a press line can be easily changed while maintaining molding accuracy.

The motion generation device according to the first disclosure is a motion generation device configured to generate motion of a slide of a press device comprising: a slide to which an upper die is attached; a bolster on which a lower die is placed; and a servomotor configured to move the slide reciprocally in an up and down direction. The motion generation device comprises a motion generation section. The motion generation section is configured to generate a second motion of the slide at a second cycle time different from a first cycle time of a first motion of the slide, such that the second motion includes the same motion as a specific portion of the first motion including at least from top dead center to an end position of a molding region, and a speed of the slide at top dead center of the second motion is the same as a speed of the first motion.

The press device according to the second disclosure is a press device for pressing a workpiece using an upper die and a lower die, the press device comprising a slide, a bolster, a servomotor, a storage section, and a control section. The upper die is attached to the slide. The lower die is placed on the bolster. The servomotor is configured to move the slide reciprocally in an up and down direction. The storage section is configured to store a second motion of the slide at a second cycle time different from a first cycle time of a first motion of the slide, such that the second motion includes the same motion as a specific portion of the first motion including at least from top dead center to an end position of the molding region, and a speed of the slide at top dead center of the second motion is the same as a speed of the first motion. The control section is configured to drive the servomotor so that the slide moves in the second motion.

The motion generation method according to the third disclosure is a motion generation method for generating a motion of a slide of a press device comprising a slide to which an upper die is attached, a bolster on which a lower die is placed, and a servomotor configured to move the slide reciprocally in an up and down direction. The motion generation method comprises a motion generation step. The motion generation step involves generating a second motion of the slide at a second cycle time different from a first cycle time of a first motion of the slide, such that the second motion includes the same motion as a specific portion of the first motion including at least from top dead center to an end position of a molding region, and a speed of the slide at top dead center of the second motion is the same as a speed of the first motion.

The present disclosure provides a motion generation device, a press device, and a motion generation method with which the speed of a press line can be easily changed while maintaining molding accuracy.

DETAILED DESCRIPTION

A tandem press line according to an embodiment of the present disclosure will be described with reference to the drawings.

Configuration

Outline of Tandem Press Line

Figure 1:
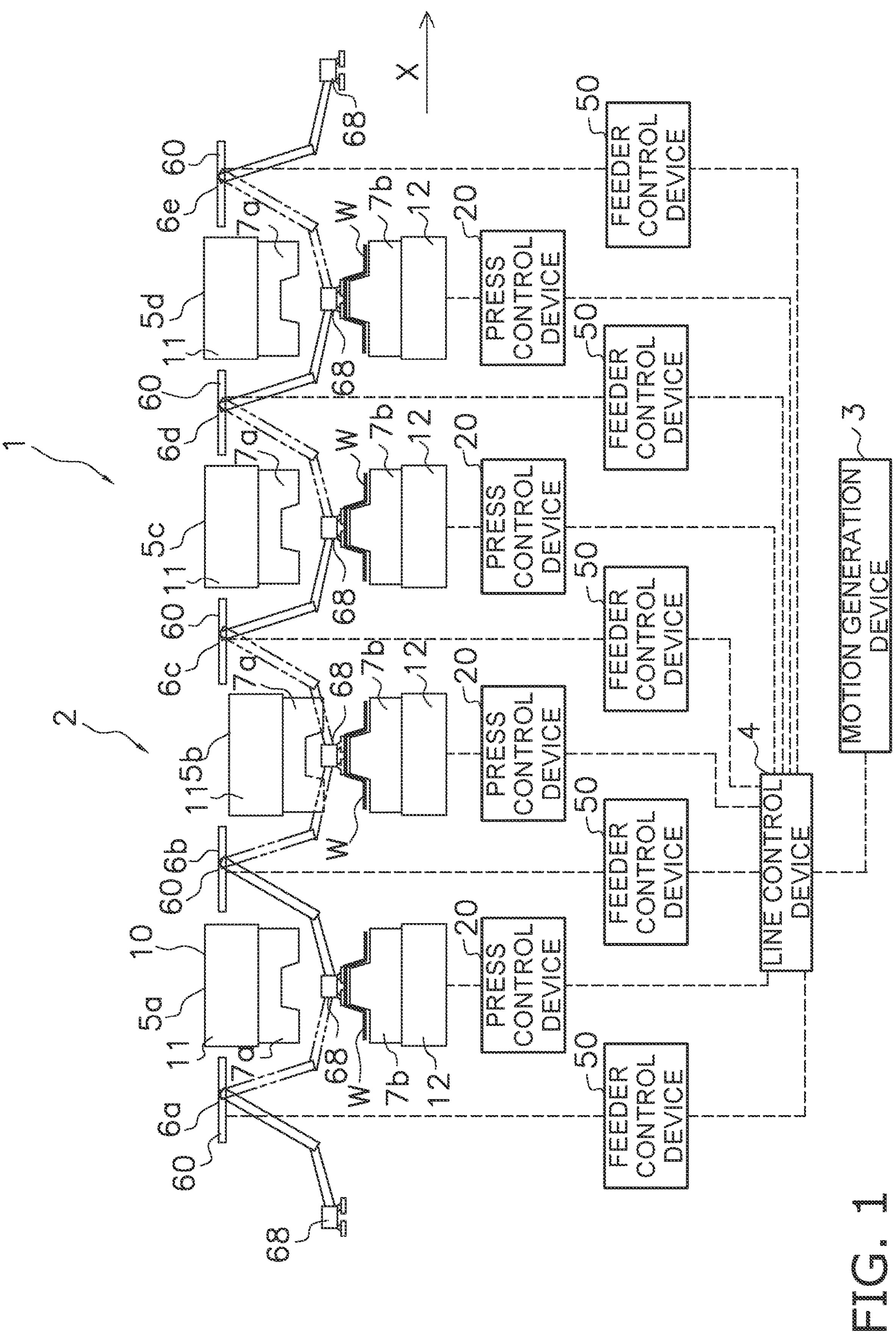
FIG. 1 is a diagram showing the configuration of a press system in an embodiment of the present disclosure.

FIG. 1 is a diagram showing the overall configuration of a press system 1 according to an embodiment of the present disclosure.

The press system 1 in this embodiment comprises a press line 2 and a motion generation device 3.

The press line 2 performs pressing in the various steps and conveys the workpiece W between the steps. The motion generation device 3 generates motion of the slides in the press devices 5*a*, 5*b*, 5*c*, and 5*d* of the press line 2. In FIG. 1, the conveyance direction of the workpiece W is indicated by X.

The press line 2 is a tandem press line, and comprises a line control device 4, a plurality of press devices 5*a*, 5*b*, 5*c*, and 5*d* (referred to collectively as the press devices 5 when the press devices are not distinguished from one another), and a plurality of feeder devices 6*a*, 6*b*, 6*c*, 6*d*, and 6*e* (referred to collectively as the feeder devices 6 when the feeder devices are not distinguished from one another).

A workpiece W conveyed into the press device 5*a* by the feeder device 6*a* is pressed by the press device 5*a* and then conveyed from the press device 5*a* to the press device 5*b* by the feeder device 6*b*. After being pressed by the press device 5*b*, the workpiece W is conveyed from the press device 5*b* to the press device 5*c* by the feeder device 6*c*, and is pressed by the press device 5*c*. After being pressed by the press device 5*c*, the workpiece W is conveyed out of the press device 5*c* by the feeder device 6*d* and conveyed to the press device 5*d*. After being pressed by the press device 5*d*, the workpiece W is conveyed out of the press device 5*d* by the feeder device 6*e*.

Press Device 5

Figure 2:
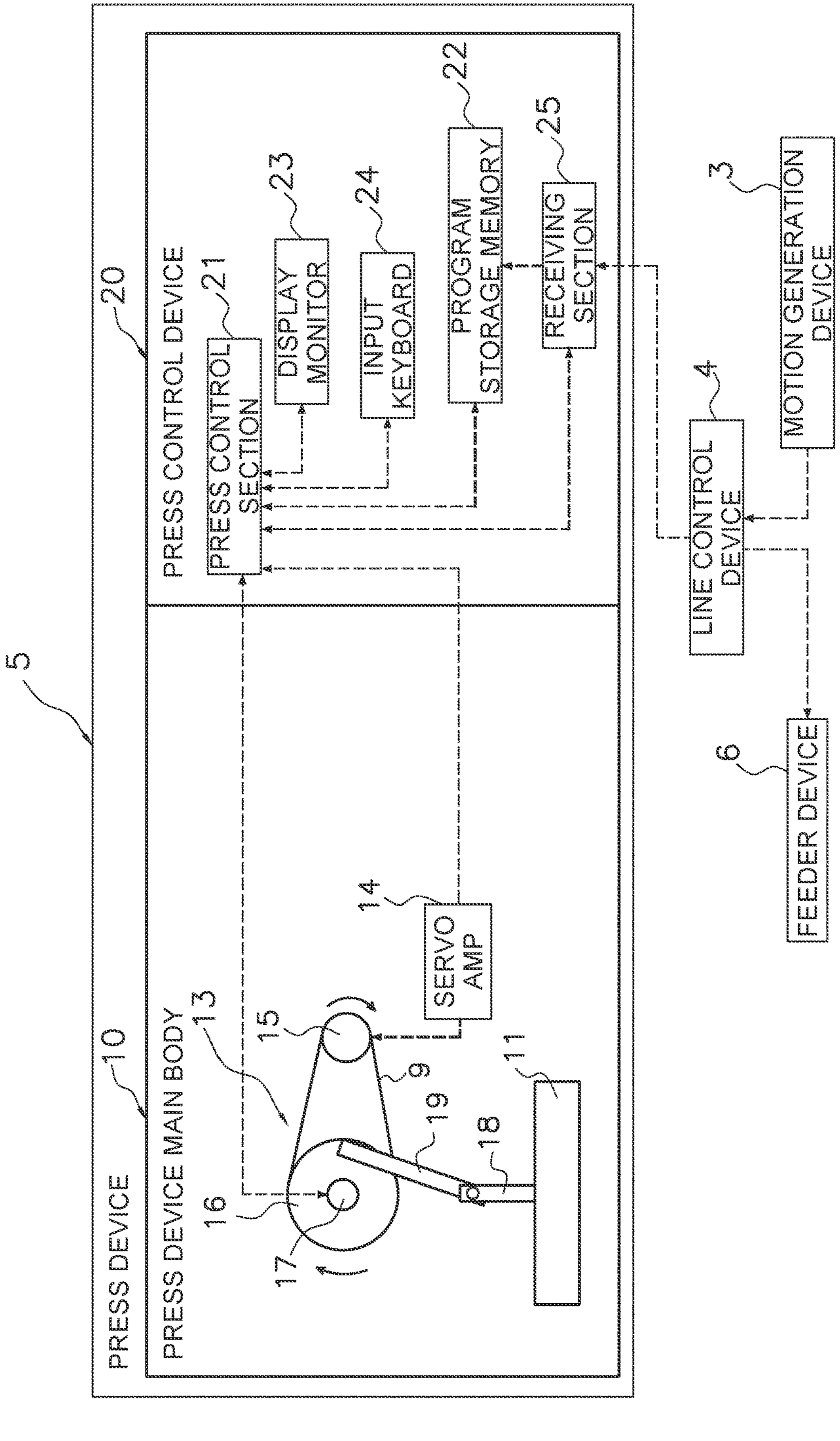
FIG. 2 is a diagram showing the configuration of a press device of the press system in an embodiment of the present disclosure.

FIG. 2 is a diagram showing the configuration of the press device 5.

Each of the press devices 5*a*, 5*b*, 5*c*, and 5*d* includes a press device main body 10 and a press control device 20, as shown in FIGS. 1 and 2. The press control device 20 controls the operation of the press device main body 10.

Press Device Main Body 10

The press device main body 10 includes a slide 11, a bolster 12 (see FIG. 1), and a slide drive section 13.

An upper die 7*a* is attached to the lower surface of the slide 11, as shown in FIG. 1. A lower die 7*b* is placed on the upper surface of the bolster 12. The slide drive section 13 drives the slide 11 in the up and down direction.

The slide drive section 13 includes a servo amplifier 14, a servomotor 15, a main gear 16, a position sensing encoder 17, a plunger 18, and a linking member 19, as shown in FIG. 2.

When the servomotor 15 is driven, the slide 11 is operated up or down with respect to the bolster 12, the result being that pressing is performed between the upper die 7*a* and the lower die 7*b*.

The servo amplifier 14 drives the servomotor 15 according to a command from the press control device 20.

The main gear 16 is linked to the shaft of the servomotor 15 by a linking member 9, such as a belt or a gear, and is rotated by the rotational drive of the servomotor 15. The position sensing encoder 17 is provided, for example, on the rotary shaft of the main gear 16, senses the rotational position of the main gear 16 (could also be referred to as the position of the slide 11), and feeds this back to the press control device 20.

The lower end of the plunger 18 is fixed to the slide 11 and the plunger 18 moves the slide 11 in the up and down direction. The linking member 19 links the main gear 16 and the plunger 18. The linking member 19 converts the rotational motion of the main gear 16 into the vertical motion of the plunger 18.

Press Control Device 20

The press control device 20 includes a press control section 21, a program storage memory 22, a display monitor 23, an input keyboard 24, and a receiving section 25.

The press control section 21 includes a processor and memory. The processor is, for example, a CPU (central processing unit). Alternatively, the processor may be a processor other than a CPU. The processor executes processing for controlling the press device main body 10 according to a program stored in the memory. The memory includes non-volatile memory, such as ROM (read-only memory), and volatile memory, such as RAM (random access memory). The memory may include an auxiliary storage device, such as a hard disk or an SSD (solid state drive). The memory is an example of a non-transitory computer-readable medium.

Although the program storage memory 22 is configured separately from the press control section 21 in this embodiment, it may be included in the memory of the press control section 21.

The program storage memory 22 stores a standard program for executing standard motion of a plurality of slides 11 corresponding to a plurality of die sets, and a derivative program for executing derivative motion. The standard motion and derivative motion will be described below.

The press control section 21 acquires position information about the slide from the position sensing encoder 17 so that the slide 11 will operate along the motion executed by the program stored in the program storage memory 22, while transmitting a command signal to the servo amplifier 14 to drive the servomotor 15. As is clear from FIG. 2, changing the speed of the servomotor 15 changes the speed of the slide 11, that is, the pressing speed.

The display monitor 23 displays the settings of the press device 5, the operating state, and so on. For example, the motions of a plurality of slides are displayed on the display monitor 23, and the operator selects a motion.

The input keyboard 24 is used by the operator to input various settings. For example, one motion is selected from a plurality of motions displayed on the display monitor 23.

The receiving section 25 receives a synchronization signal transmitted from the line control device 4. The synchronization signal is used for adjusting the timing at which the plurality of press devices 5*a* to 5*d* and the feeder devices 6*a* to 6*e* are actuated. The press control section 21 drives the press device main bodies 10 based on these synchronization signals.

The receiving section 25 also receives a derivative program for executing a derivative motion generated by the motion generation device 3. The derivative program received by the receiving section 25 is stored in the program storage memory 22 by an operation of the press control section 21.

Feeder Device 6

The feeder devices 6*a*, 6*b*, 6*c*, 6*d*, and 6*e* are all structured the same.

Figure 3:
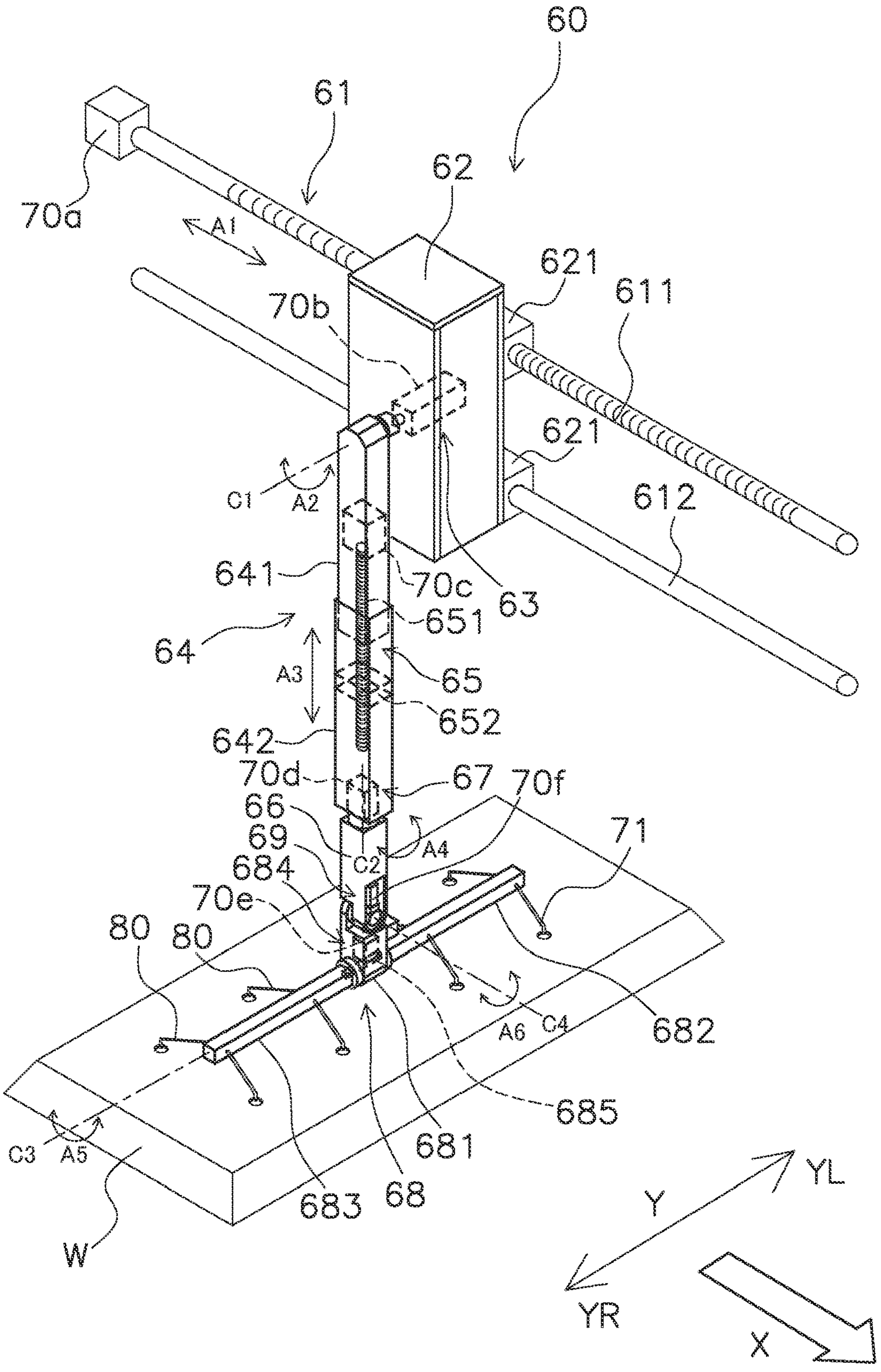
FIG. 3 is an oblique view of the configuration of a feeder device main body of the press system in an embodiment of present disclosure.
Figure 4:
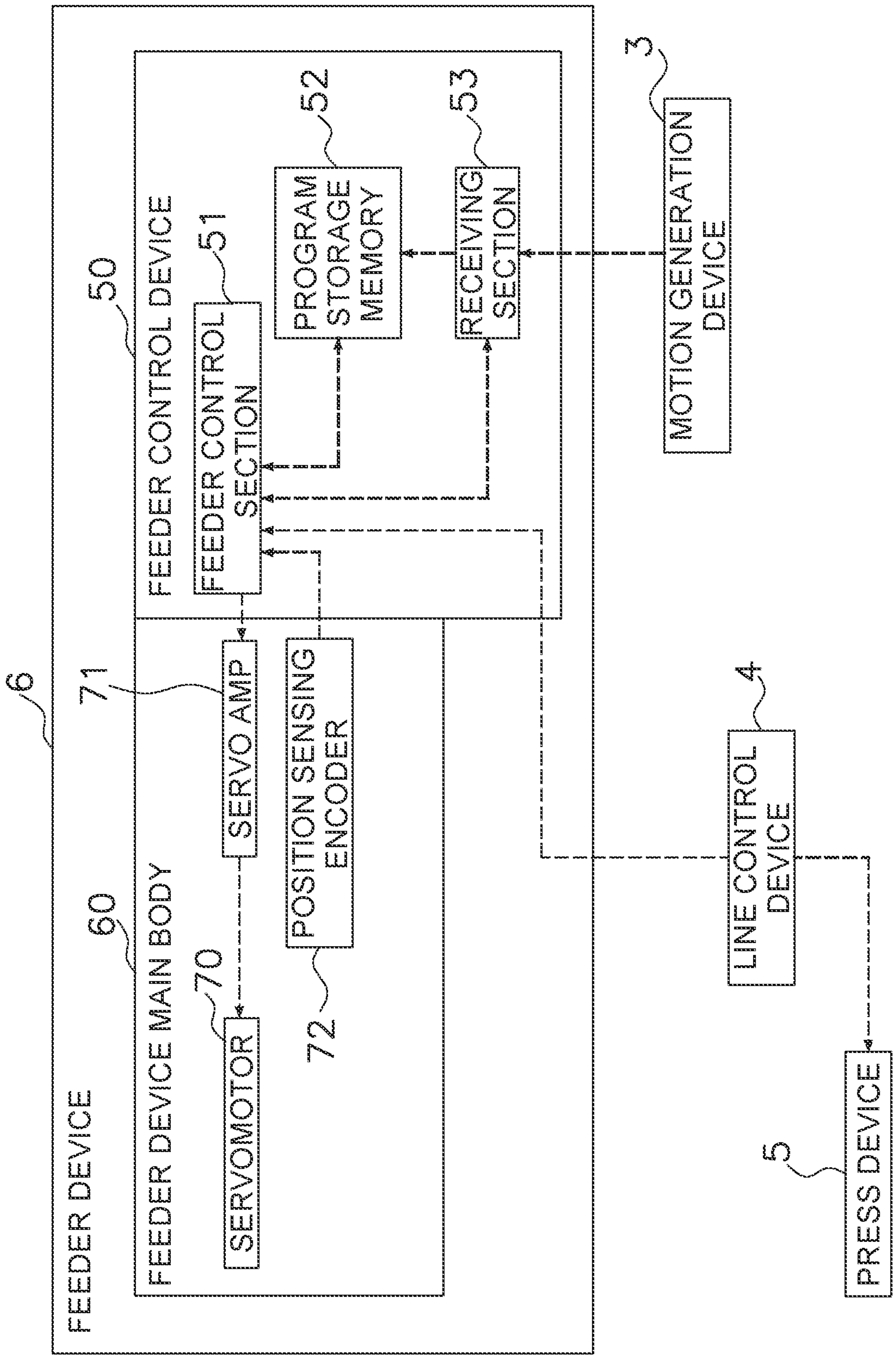
FIG. 4 is a block diagram showing the configuration of the feeder device of the press system in an embodiment of the present disclosure.

FIG. 3 is an oblique view of a feeder device 6. In FIG. 3, Y is the width direction perpendicular to the conveyance direction X, YL is the left direction facing the conveyance direction X, and YR is the right direction. FIG. 4 is a block diagram showing the configuration of a feeder control device 50.

As shown in FIG. 4, the feeder device 6 includes a feeder device main body 60 and a feeder control device 50. The feeder control device 50 controls the operation of the feeder device main body 60.

Feeder Device Main Body 60

The feeder device main body 60 includes a slide mechanism 61, an arm support portion 62, a rotating portion 63, a first arm 64, an extendable portion 65, a second arm 66, a rotating portion 67, a conveying bar 68, and a rotating portion 69.

The slide mechanism 61 is disposed between the press device 5*a* and the press device 5*b*. The slide mechanism 61 includes a ball screw 611, a guide 612, and a servomotor 70*a*. The ball screw 611 extends along the conveyance direction X from the press device 5*a* toward the press device 5*b*. The guide 612 is columnar and is disposed parallel to the ball screw 611 under the ball screw 611. The servomotor 70*a* is connected to one end of the ball screw 611 via a speed reduction device or the like, and rotates the ball screw 611.

The arm support portion 62 is a box-shaped member that rotatably supports the first arm 64. A pair of upper and lower blocks 621 are provided on the side surface of the arm support portion 62 on the left direction YL side. A through-hole is formed in the upper block 621 along the conveyance direction X, and threads are formed on the inner surface thereof. The ball screw 611 is inserted into the through-hole of the upper block 621 and meshes with the threads on the inner surface of the through-hole. Also, a through-hole is formed in the lower block 621 along the conveyance direction X, and the guide 612 is inserted therein. When the ball screw 611 is rotated by the rotation of the servomotor 70*a*, the arm support portion 62 is guided by the guide 612 and can move upstream or downstream in the conveyance direction X (see the arrow A1).

The rotating portion 63 is provided to the arm support portion 62 and rotates the first arm 64. The rotating portion 63 includes a servomotor 70*b* and a speed reduction unit (not shown). The servomotor 70*b* is fixed on the inside of the arm support portion 62. The servomotor 70*b* is disposed so that the drive shaft extends in the right direction YR.

The first arm 64 is fixed at its upper end portion to the drive shaft of the servomotor 70*b* via a speed reduction unit. The first arm 64 rotates around a central axis C1 along the width direction Y (see the arrow A2).

The first arm 64 is configured to be extendable, and includes a hollow first portion 641 and a hollow second portion 642. The upper end portion of the first portion 641 is fixed to the drive shaft of the servomotor 70*b* via a speed reduction unit. The lower end portion of the first portion 641 is recessed inside the upper end portion of the second portion 642.

The extendable portion 65 is provided to the first arm 64 and extends and contracts the first arm 64. The extendable portion 65 includes a ball screw 651, a servomotor 70*c*, and a fitting nut 652. The ball screw 651 is disposed on the inside of the first arm 64 along the lengthwise direction of the first arm 64. The ball screw 651 is disposed all the way to the first portion 641 and the second portion 642. The servomotor 70*c* is fixed on the inside of the first portion 641. The drive shaft of the servomotor 70*c* is linked to the ball screw 651 via a speed reduction unit. The fitting nut 652 is fixed on the inside of the second portion 642 so that the through-hole extends along the lengthwise direction of the first arm 64. The ball screw 651 is inserted into the through-hole of the fitting nut 652, and the ball screw 651 is meshed with the threads formed on the inner surface of the through-hole.

Consequently, when the ball screw 651 is rotated by the drive of the servomotor 70*c*, the second portion 642 moves with respect to the first portion 641 together with the fitting nut 652, so the first arm 64 can be extended and contracted (see the arrow A3).

The second arm 66 is disposed along the lengthwise direction of the first arm 64 at the lower end of the first arm 64. The lengthwise direction of the second arm 66 coincides with the lengthwise direction of the first arm 64.

The rotating portion 67 is provided to the second portion 642 of the first arm 64 and rotates the second arm 66. The rotating portion 67 includes a servomotor 70*d* and a speed reduction unit (not shown). The servomotor 70*d* is fixed on the inside of the second portion 642. The servomotor 70*d* is disposed such that the drive shaft extends along the lengthwise direction of the first arm 64, and the drive shaft extends downward.

The upper end of the second arm 66 is fixed to the drive shaft of the servomotor 70*d* via a speed reduction unit. The second arm 66 can rotate, with its lengthwise direction serving as a central axis C2 (see the arrow A4).

The conveying bar 68 is disposed along the width direction Y at the lower end of the second arm 66. A holder 80 for holding the workpiece W is detachably attached to the conveying bar 68. The conveying bar 68 includes a linking portion 681, a left bar 682, a right bar 683, and a bar rotating portion 684. The linking portion 681 is linked to the lower end of the second arm 66. The left bar 682 is rotatably attached to the left direction YL side of the linking portion 681. The right bar 683 is rotatably attached to the right direction YR side of the linking portion 681. The left bar 682 and right bar 683 are linked by a linking shaft 685. The left bar 682, the right bar 683, and the linking shaft 685 rotate with their lengthwise direction as the central axis C3.

The bar rotating portion 684 is disposed on the inside of the linking portion 681 and includes a servomotor 70*e* and a speed reduction unit. The drive shaft of the servomotor 70*e* meshes with the threads around the linking shaft 685 via a speed reduction unit. The rotation of the servomotor 70*e* causes the linking shaft 685 to rotate, and the left bar 682 and the right bar 683 connected to the linking shaft 685 also rotate (see the arrow A5).

The rotating portion 69 is provided to the second arm 66. The linking portion 681 of the conveying bar 68 is linked to the lower end portion of the second arm 66 so as to be rotatable, with the direction along the conveyance direction X serving as the central axis C4. The rotating portion 69 includes a servomotor **70*f* and a speed reduction unit. The drive shaft of the servomotor 70*f* is fixed to the upper end portion of the linking portion 681 via a speed reduction unit. The drive of the servomotor 70*f* causes the conveying bar 68 to rotate, with conveyance direction X serving as the central axis C4 (see the arrow A6**).

Also, as shown in the block diagram of FIG. 4, the feeder device main body 60 includes servomotors 70 (more precisely, the servomotors **70*a* to 70*f*, collectively referred to as the servomotors 70), a servo amplifier 71, and a position sensing encoder 72. The servo amplifier 71 drives the servomotor 70 according to a command from the feeder control device 50. The position sensing encoder 72 senses the position of the servomotor 70 and feeds this back to the feeder control device 50. More precisely, the servo amplifier and the position sensing encoder are provided for each of the servomotors 70*a* to 70*f***.

Feeder Control Device 50

The feeder control device 50 controls the feeder device main body 60.

The feeder control device 50 comprises a feeder control section 51, a program storage memory 52, and a receiving section 53. The feeder control device 50 in this embodiment is not provided with a display monitor or an input keyboard, but these may be provided.

The feeder control section 51 includes a processor and memory. The processor is, for example, a CPU (central processing unit). Alternatively, the processor may be a processor other than a CPU. The processor executes processing for controlling the feeder device main body 60 according to a program stored in the memory. The memory includes non-volatile memory, such as ROM (read-only memory), and volatile memory, such as RAM (random access memory). The memory may include an auxiliary storage device, such as a hard disk or an SSD (solid state drive). The memory is an example of a non-transitory computer-readable medium. The memory stores programs and data for controlling the feeder device main body 60, and stores a plurality of motions.

In this embodiment, the program storage memory 52 is described as being constituted separately from the feeder control section 51, but may instead be included in the memory of the feeder control section 51.

The feeder control section 51 drives the servomotor 70 by transmitting a command to the servo amplifier 71 so that the feeder device main body 60 is driven along a motion stored in the program storage memory 52, thereby conveying the workpiece W to the press device 5.

The receiving section 53 receives a synchronization signal transmitted from the line control device 4. The feeder control section 51 drives the feeder device main body 60 on the basis of this synchronization signal.

Line Control Device 4

Figure 5:
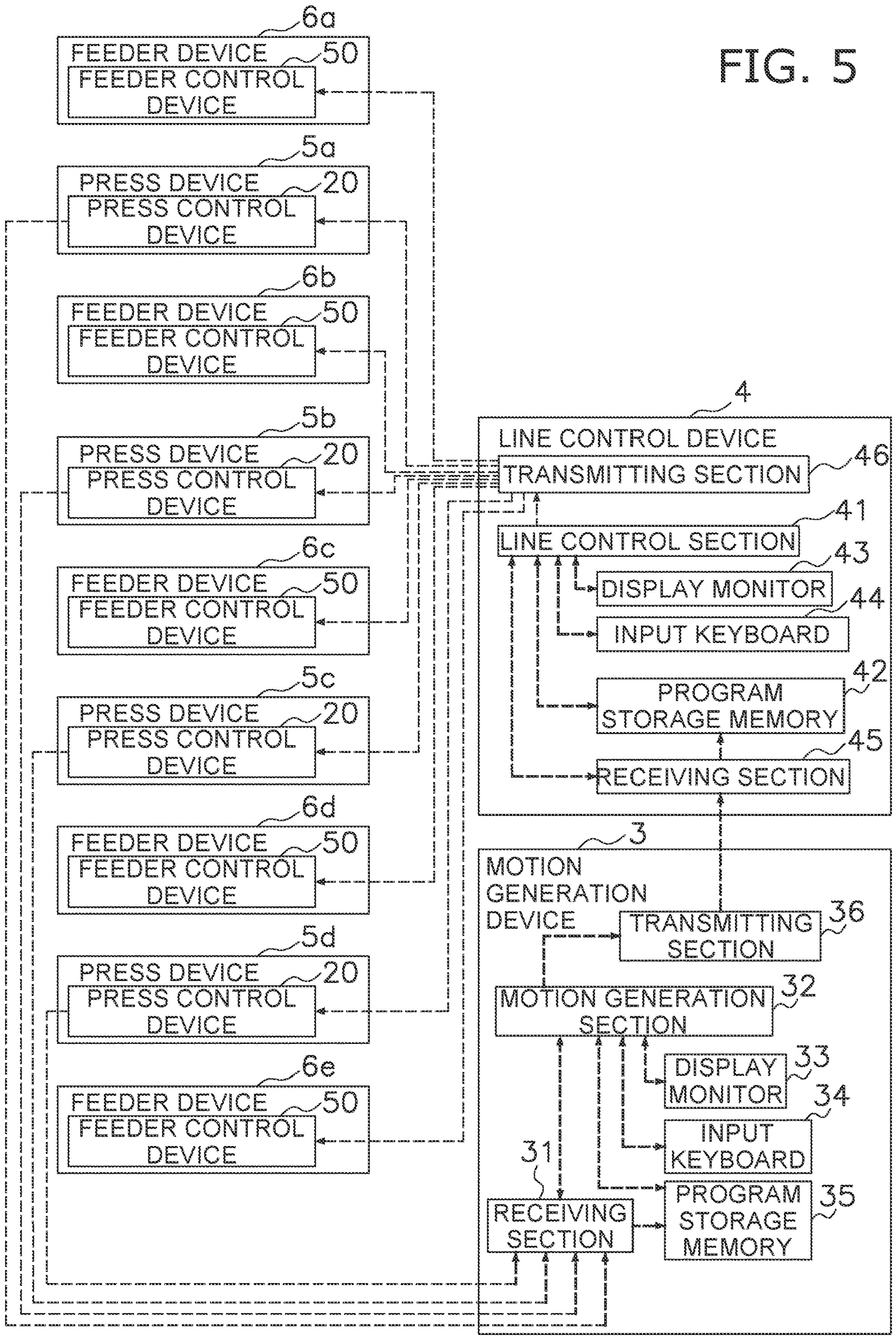
FIG. 5 is a block diagram showing the configuration of a line control device and a motion generation device of the press system in an embodiment of the present disclosure.

FIG. 5 is a block diagram showing the configuration of the line control device 4 and the motion generation device 3.

The line control device 4 comprises a line control section 41, a program storage memory 42, a display monitor 43, an input keyboard 44, a receiving section 45, and a transmitting section 46.

The line control section 41 includes a processor and memory. The processor is, for example, a CPU (central processing unit). Alternatively, the processor may be a processor other than a CPU. The processor executes processing for controlling the press device 5 and the feeder device 6 according to a program stored in the memory. The memory includes non-volatile memory, such as ROM (read-only memory), and volatile memory, such as RAM (random access memory). The memory may include an auxiliary storage device, such as a hard disk or an SSD (solid state drive). The memory is an example of a non-transitory computer-readable medium. The memory stores programs and data for controlling the press device 5 and the feeder device 6. In this embodiment, the program storage memory 42 is described as being constituted separately from the line control section 41, but may instead be included in the memory of the line control section 41.

The program storage memory 42 stores the motion of the press line 2 with respect to the set of dies being used (upper die **7*a* and lower die 7*b*). The "set of dies being used" means a plurality of dies used in the plurality of press devices 5*a*, 5*b*, 5*c*, and 5*d* to complete a specific product from the workpiece W. The motion of the press line 2 includes the motions of the press devices 5*a* to 5*d* and the feeder devices 6*a* to 6*e*. This will be described in detail below, but the program storage memory 42 stores standard programs for executing preset standard motions of the press device 5, and derivative motions for executing derivative motions created by the motion generation device 3** using the standard motions.

The display monitor 43 performs display for selecting the die set to be used, display for selecting a motion, display for setting the conditions of the press line 2, display of the operating state, and so forth.

The input keyboard 44 is used by the operator to input various settings. For instance, this is used to select the die set to be used, or to select one of the motions displayed on the display monitor 23.

The receiving section 45 receives a derivative motion created by the motion generation device 3 (discussed below), and stores it in the program storage memory 42. The transmitting section 46 transmits the received derivative motion to the press devices **5*a* to 5*d***.

Motion Generation Device 3

The motion generation device 3 generates a derivative motion which has a different cycle time from that of a standard motion from the standard motion.

As shown in FIG. 5, the motion generation device 3 includes a receiving section 31, a motion generation section 32, a display monitor 33, an input keyboard 34, a program storage memory 35, and a transmitting section 36.

The receiving section 31 receives a standard program for executing a standard motion of the slide 11, stored in the program storage memory 22 of the press control device 20. When the standard program is also stored in the line control device 4, the receiving section 31 may receive the standard program from the line control device 4.

The press control device 20 is provided with standard programs corresponding to the number of registered die sets. For example, when n-number of die sets can be mounted on the press devices **5*a* to 5*d*, then n-number of standard programs P1 to Pn are provided in advance. That is, a standard program P1 corresponding to a die set (1) is preset, a standard program P2 corresponding to a die set (2**) is preset, and a standard program Pn corresponding to a die set (n) is preset.

The motions executed by the press device 5 using the standard programs P1 to Pn shall be referred to as the standard motions M1 to Mn. Each of the standard motions M1 to Mn is preset so that there is no interference between the press devices 5 and the feeder devices 6 when the corresponding die set is used.

A standard program is denoted by Pi (where i=1 to n), and a standard motion is denoted by Mi (wherein i=1 to n). In addition, n may be 1. Also, the indication that i=1 to n will be omitted as appropriate.

The motion generation section 32 produces derivative programs Pij (j=1 to m) that execute m-number of derivative programs Mij (j=1 to m) that are different in cycle time from the standard motions Mi of any of the standard programs Pi of the standard programs P1 to Pn. A derivative program of a standard program Pi is denoted as Pij (j=1 to m), and a derivative motion of a standard motion Mi is denoted as Mij (j=1 to m). In addition, m may be 1. Also, the indication that j=1 to m will be omitted as appropriate.

Different cycle times means that the SPM (shots per minute) values are different. The SPM is the number of shots per minute by a press device, and the higher is the SPM, the shorter is the cycle time, and the lower is the SPM, the longer is the cycle time. When a standard motion Mi is set, for example, to 20 SPM as the maximum speed of the press line 2, derivative motions Mij of less than 20 SPM are created, such as 19 SPM or 18 SPM. For example, derivative motions Mij may be created in increments of 1 SPM or 0.5 SPM down to the SPM of the minimum speed in the specifications of the press line 2. Also, the number m of derivative motions may be set according to the user's request.

The motion generation section 32 includes a processor and a memory. The processor is a CPU (central processing unit), for example. Alternatively, the processor may be a processor other than a CPU. The processor executes processing for creating derivative motions Mij according to a program stored in the memory. The memory includes non-volatile memory, such as ROM (read-only memory), and volatile memory, such as RAM (random access memory). The memory may include an auxiliary storage device, such as a hard disk or an SSD (solid state drive). The memory is an example of a non-transitory computer-readable medium. The memory stores programs for creating derivative motions Mij. In this embodiment, the program storage memory 35 is configured separately from the motion generation section 32, but may instead be included in the memory of the motion generation section 32.

The program storage memory 35 stores standard programs Pi received by the receiving section 31. The program storage memory 35 also stores derivative programs Pij created from the standard programs Pi.

Standard Motions Mi Next, the standard motions Mi stored in the press device 5 will be described.

Figure 6:
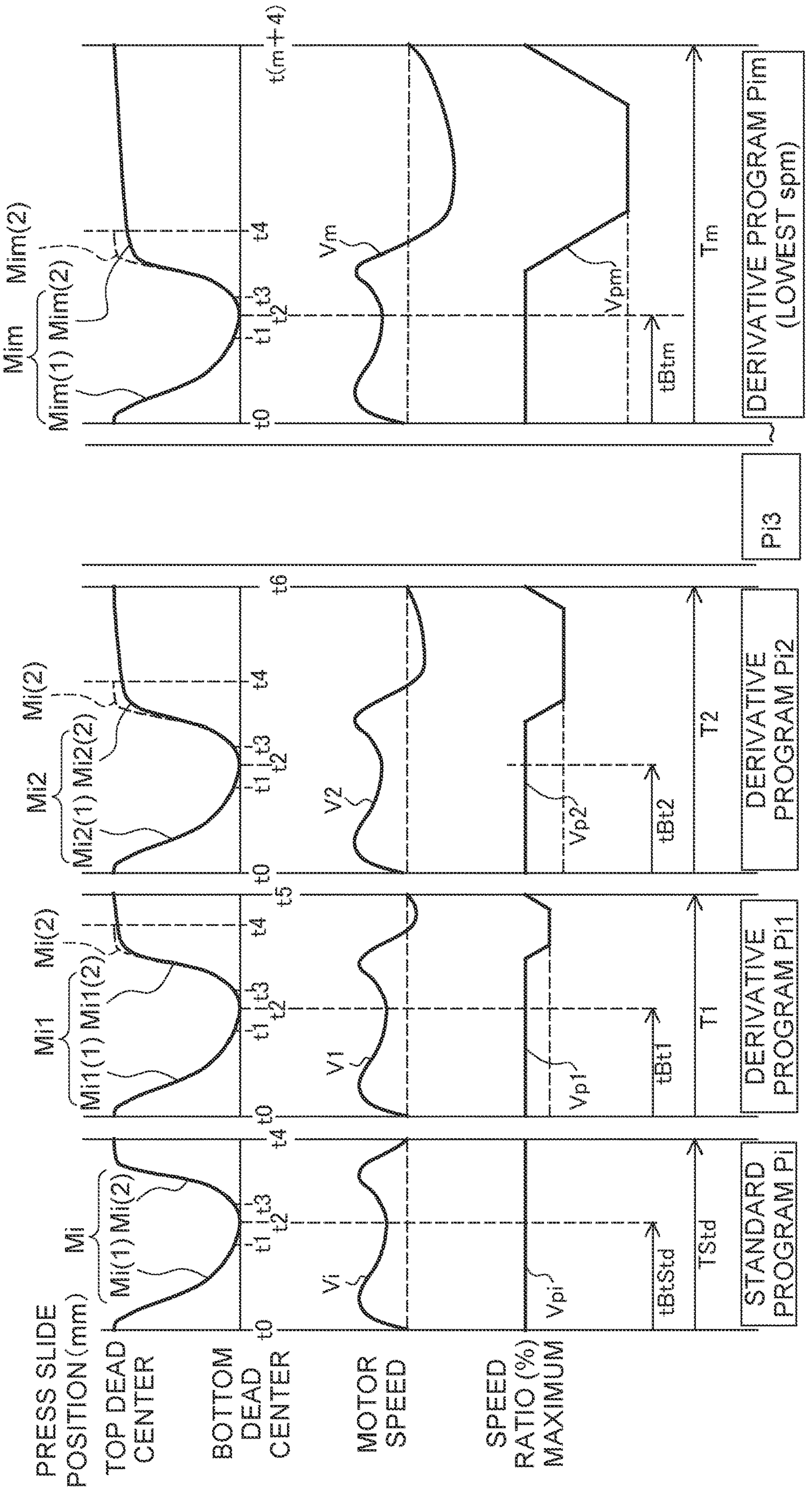
FIG. 6 is a diagram showing standard motion and derivative motion in an embodiment of the present disclosure.

FIG. 6 is a diagram showing standard motions Mi executed by the standard programs Pi and derivative motions Mij executed by the derivative programs Pij (discussed below).

In FIG. 6, the standard motion Mi executed by the standard program Pi is shown on the far left side.

The upper row at the left side of FIG. 6 shows one cycle of press operation (standard motion Mi) in which the slide 11 passes from top dead center to bottom dead center and reaches top dead center again.

At the start time (t0) of the cycle time TStd in the standard motion Mi executed by the standard program Pi, the slide 11 is positioned at top dead center. The servomotor 15 is driven by the press control section 21, and the slide 11 is moved downward. The slide 11 reaches the molding region at time t1, and pressing is performed on the workpiece W. After the slide 11 reaches bottom dead center at time t2, the slide 11 moves upward, and at time t3 the slide 11 moves away from the molding region, and the pressing of the workpiece W is ended.

The molding region is the region in which the upper die 7*a* comes into contact with the workpiece W placed on the lower die 7*b*, and pressure is applied to the workpiece W.

Between the times t1 and t3, the upper die 7*a* is touching the workpiece W and molding is performed. At time t4, the slide 11 returns to top dead center. One cycle is thus performed.

Also, in the standard motion Mi of the slide 11, the region from top dead center to the end position of the molding region is termed the first region Mi(1), and the region from the end position of the molding region to the next top dead center is termed the second region Mi(2). The first region Mi(1) is the region from the time t0 (top dead center), past the time t2 (bottom dead center), and on to the time t3, and the second region Mi(2) is the region from the time t3 to the time t4 (top dead center). In FIG. 6, the time from top dead center to bottom dead center in the standard motion Mi is shown as tBtStd.

In the standard motion Mi of this embodiment, the SPM is set to the maximum value, and the cycle time at this point is indicated by TStd. In the standard motion Mi, the time required for one cycle (cycle time) can be said to be set to the minimum value.

The middle row on the left side in FIG. 6 shows the motor speed Vi of the servomotor 15 corresponding to the motion of the slide 11 (an example of the speed of the slide). The motor speed Vi is set to a speed at which the standard motion Mi with maximum SPM is executed. As shown in FIG. 6, the motor speed Vi is increased or decreased when executing the standard motion Mi. For example, as shown in the middle row on the left side in FIG. 6, the speed of the servomotor 15 is the lowest at top dead center, the speed of the servomotor 15 increases in the portion going from top dead center to bottom dead center, and the speed of the servomotor 15 decreases at bottom dead center. The speed of the servomotor 15 increases in the portion going from bottom dead center to top dead center, and decreases at top dead center.

The lower row in FIG. 6 shows the speed ratio Vpi (%) of the motors executing the respective motions shown in the upper row with respect to the speed of the motor executing the standard motion Mi.

Graphs other than the far left one in the lower row show the ratio of the speed of the motor executing the derivative motion Mij (discussed below) to the speed of the motor executing the standard motion Mi. Since the lower row at the left end in FIG. 6 shows the ratio of the speed Vi of the motor executing the standard motion Mi to the speed Vi of the motor executing the standard motion Mi, the speed ratio Vpi is 100(%). This 100% speed ratio is shown as the maximum speed percentage. Thus, the maximum speed ratio in the lower row at the left end indicates the speed Vi of the motor for executing the standard motion Mi. In other words, the fact that the speed ratio Vpi is 100% in the standard motion Mi does not mean that the servomotor 15 continues to rotate at its maximum speed.

Derivative Motions Mij

The derivative motions Mij created from the standard motion Mi by the motion generation section 32 will now be described.

The derivative motions Mij (j=1 to m) created from the standard motion Mi are shown on the right side of the standard motion Mi in FIG. 6. In FIG. 6, the motion is set so that the SPM decreases (the cycle time increases) as m increases.

A derivative motion Mi1 whose cycle time is T1 (T1>TStd) is shown on the right side of standard motion Mi in FIG. 6. The region from top dead center in the derivative motion Mi1 to the end position of the molding region is termed the first region Mi1(1), and the region from the end position of the molding region to the next top dead center is termed the second region Mi1(2). The first region Mi1(1) is the region from the time t0 (top dead center), past the time t2 (bottom dead center), and then to the time t3, and the second region Mi1(2) is the region from the time t3 to the time t5 (top dead center).

The derivative motion Mi1 is set so that the SPM is smaller than in the standard motion Mi, while the first region Mi1(1) keeps the same motion shape as in the first region Mi(1) of the standard motion Mi. In a graph showing the derivative motion Mi1, the second region Mi(2) of the standard motion Mi is indicated by a dotted line, and the time t4 is also shown.

The first region Mi1(1) of the derivative motion Mi1 is created to have the same motion as the first region Mi(1) of the standard motion Mi. Therefore, the duration tBt1 from top dead center to bottom dead center in the derivative motion Mi1 is set to the same duration as the duration tBtStd from top dead center to bottom dead center in the standard motion Mi.

The second region Mi1(2) of the derivative motion Mi1 is set longer than the second region Mi(2) of the standard motion Mi.

More specifically, as shown by the speed ratio Vp1 in the lower row and the motor speed V1 in the middle row of the second column from the left end in FIG. 6, the motor speed is reduced a certain amount from the motor speed Vi in the standard motion Mi within the range of the second region Mi1(2), and then returned to the motor speed Vi in the standard motion Mi. Consequently, as shown in the upper part of FIG. 6, the motion is such that the duration of the second region Mi(2) of the standard motion Mi is longer. Because the motor speed is thus first reduced from the motor speed Vi in the standard motion Mi, the cycle time becomes T1 (>TStd). Therefore, the time t5 at which top dead center is reached in the derivative motion Mi1 is later than the time t4. The decrease and increase of the pressing speed can be determined according to the capability of the press device 5. Also, the extent to which the pressing speed is reduced can be determined by the length of the cycle time and by the decrease or increase of the pressing speed. Within the range of the second region Mi1(2), the point at which the pressing speed begins to decrease below the speed of the standard motion Mi is preferably after the slide has risen to a height at which there is no risk of interference with the feeder device (conveyance region R1; discussed below).

As described above, in order to make the second region Mi1(2) in the derivative motion Mi1 longer than the second region Mi(2) in the standard motion Mi, the speed V1 of the servomotor 15 is decreased below the speed Vi in the standard motion Mi, is increased and then returns to the speed Vi in the standard motion Mi by the time t5 at which top dead center is reached. Consequently, the slide 11 can be driven from top dead center at the same speed as in the standard motion Mi in the next cycle, so the first region Mi1(1) of the derivative motion Mi1 can be the same motion as that of the first region Mi(1) of the standard motion Mi. Therefore, the derivative motion Mi1 can be a motion having a longer cycle time than the standard motion, while maintaining the same molding accuracy as in the standard motion.

The derivative motion Mi2 is shown on the right side of derivative motion Mi1 in FIG. 6. The region from top dead center to the end position of the molding region in the derivative motion Mi2 is termed the first region Mi2(1), and the region from the end position of the molding region to the next top dead center is termed the second region Mi2(2). The first region Mi2(1) is the region from the time t0 (top dead center), past the time t2 (bottom dead center), and then to the time t3, and the second region Mi2(2) is the region from the time t3 to the time t6 (top dead center).

The derivative motion Mi2 is set to have a smaller SPM than the derivative motion Mi1, while the first region Mi2(1) maintains the same motion shape as the first region Mi(1) of the standard motion Mi. In the graph showing the derivative motion Mi2, the second region Mi(2) of the standard motion Mi is indicated by a dotted line, and the time t4 is also shown.

The derivative motion Mi2 is created such that its first region Mi2(1) is the same motion as in the first region Mi(1) of the standard motion Mi. Therefore, the duration tBt2 from top dead center to bottom dead center in the derivative motion Mi2 is set to the same duration as the time tBtStd from top dead center to bottom dead center in the standard motion Mi.

The second region Mi2(2) of the derivative motion Mi2 is set longer than the second region Mi(2) of the standard motion Mi and the second region Mi1(2) of the derivative motion Mi1. Therefore, the time t6 at which the derivative motion Mi1 reaches top dead center is later than the times t4 and t5. The details regarding the lengthening of the duration of the second region Mi2(2) of the derivative motion Mi2 are the same as for the above-mentioned lengthening of the duration of the second region Mi1(2) of the derivative motion Mi1, and therefore will not be described again.

As described above, in order to make the second region Mi2(2) in the derivative motion Mi2 longer than the second region Mi1(2) of the derivative motion Mi1 and the second region Mi(2) of the standard motion Mi, as shown by speed ratio Vp2 in the lower row and the motor speed V2 in the middle row of the third column from the left end in FIG. 6, the speed V2 of the servomotor 15 is reduced below the speed Vi in the standard motion Mi and the speed V1 in the derivative motion M1, is increased and then is returned to the speed Vi in the standard motion Mi by the time t5 at which top dead center is reached.

In this way, derivative motions Mij (j=1 to m) are created in which the SPMs are set to decrease in order. In this embodiment, derivative motions up to Mim are created at the lowest SPM of the press line 2. When the SPM in the standard motion Mi is 20, the minimum SPM is 16, and the creation interval of the derivative motions Mij is set to 1 SPM, then m is 4. In this case, a derivative motion Mi1 with an SPM of 19, a derivative motion Mi2 with an SPM of 18, a derivative motion Mi3 with an SPM of 17, and a derivative motion Mi4 with an SPM of 16 are generated.

Just as with the derivative motions Mi1 and Mi2 described above, the region from top dead center to the end position of the molding region in the derivative motion Mim is termed the first region Mim(1), and the region from the end position of the molding region to the next top dead center is termed the second region Mim(2). The first region Mim(1) is the region from the time t0 (top dead center), past the time t2 (bottom dead center), and then to the time t3, and the second region Mim(2) is the region from the time t3 to the time t(4+m) (top dead center). The time t(4+m) indicates the arrival time of the derivative motion Mi at top dead center, and when m is 1, this becomes the time t5 shown in the derivative motion Mi1, and when m is 2, becomes the time t6 shown in the derivative motion Mi2. Also, when m is 4, the arrival times at top dead center in the other derivative motions Mi1, Mi2, and Mi3 can be expressed as t5, t6, and t7, so the time t(4+m) becomes t8.

The derivative motion Mim is set to have the smallest SPM, while the first region Mim(1) maintains the same motion shape as the first region Mi(1) of the standard motion Mi. In the graph showing the derivative motion Mim, the second region Mi(2) of the standard motion Mi is indicated by a dotted line, and the time t4 is also shown.

The derivative motion Mim is created such that its first region Mim(1) is the same motion as in the first region Mi(1) of the standard motion Mi. Therefore, the duration tBtm from top dead center to bottom dead center in the derivative motion Mim is set to the same duration as the duration tBtStd from top dead center to bottom dead center in the standard motion Mi.

The second region Mim(2) of the derivative motion Mim is set to a longer duration than the second region Mi(2) of the standard motion Mi and the other derivative motions Mij (j=1 to m−1). Therefore, the time t(4+m) at which the derivative motion Mim reaches top dead center is later than the time at which the other derivative motions reach top dead center. The details regarding the lengthening of the duration of the second region Mim(2) of the derivative motion Mim are the same as for the above-mentioned lengthening of the duration of the second region Mi1(2) of the derivative motion Mi1, and therefore will not be described again.

Also, in order to make the second region Mi(2) of the derivative motion Mim longer than the second region Mi(2) of the standard motion Mi, as shown by the speed ratio Vpm in the lower row and the motor speed Vm in the middle row at the right end in FIG. 6, the speed Vm of the servomotor 15 is reduced below the speed in the standard motion Mi and other derivative motions Mij (j=1 to m−1), is increased and then returns to the speed in the standard motion Mi by the time t(4+m) at which top dead center is reached.

In the above description, the first region in the derivative motion Mij is indicated as Mij(1), and the second region is indicated as Mij(2).

Returning to FIG. 5, the display monitor 33 gives a display for setting the SPM interval of the derivative motion to be created. Also, derivative motions may be created down to the minimum SPM in the specifications of the press line 2, but a display for inputting the SPM value for creating a derivative motion may be given on the display monitor 33. Also, a display for inputting the value of m may be given on the display monitor 33.

The input keyboard 34 is used by the operator to input various settings. For example, the SPM interval for creating a derivative motion, input of the above-mentioned SPM value, or input of the m value may be performed.

The transmitting section 36 transmits the derivative program ij for executing the derivative motions Mij created by the motion generation section 32 to the line control device 4. The line control device 4 stores the received derivative program ij in the program storage memory 42, and transmits this to the press control section 21 of the press control device 20. The press control section 21 stores the received derivative program ij in the program storage memory 22.

Motion Generation Method

Next, the method by which the motion generation section 32 creates a derivative motion Mij from the standard motion Mi will be described.

Figure 7:
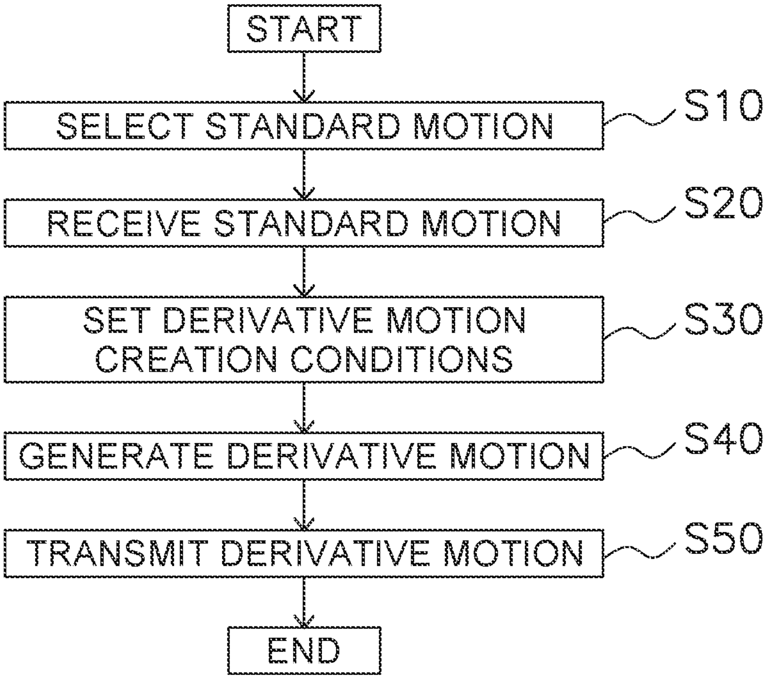
FIG. 7 is a flowchart showing the operation of the motion generation device of the press system in an embodiment of the present disclosure.

FIG. 7 is a flowchart showing the operation of the motion generation device 3.

First, in step S10, one of the standard motions Mi (i=1 to n) stored in the press device 5 is selected by the operator using the display monitor 33 and the input keyboard 34. As discussed above, the standard motion Mis are associated with a die set (i).

Next, in step S20, the receiving section 31 receives the standard program Pi for executing the selected standard motion Mi from the press control device 20 of the press device 5. The motion generation device 3 does not need to acquire the standard program Pi from the press control device 20 wirelessly or by wire, and instead standard programs Pi may be stored on an SD card or other such storage medium, and the motion generation device 3 may acquire a standard program Pi from this storage medium. Also, the standard program Pi may be acquired from some other device in which standard programs Pi are stored, rather than just the press device 5. The receiving section 31 is an example of an acquisition section for acquiring the standard motion Mi.

Next, in step S30, the operator uses the display monitor 33 and the input keyboard 34 to set conditions for creating the derivative motions Mij (j=1 to m). Examples of creation conditions that are set include the interval of SPMs for creating derivative motions Mij (j=1 to m), the value of m, and the like.

Next, in step S40, the motion generation section 32 creates derivative motions Mij from the standard motion Mi on the basis of the creation conditions. For example, when the SPM of the standard motion Mi is set to 20, the minimum SPM is set to 17, and the SPM interval is set to 1, three derivative motions Mij (j=1 to 3) with SPMs of 19, 18, and 17 are created. Alternatively, three derivative motions Mij (j=1 to 3) with SPMs of 19, 18, and 17 are similarly created when the value of m is set to 3 instead of setting the SPM interval.

When creating the derivative motions Mij, the motion generation section 32 forms the first region Mij(1) so as to be the same as the first region Mi(1) of the standard motion Mi. Also, in order to obtain the desired SPM, the pressing speed for the second region Mi(2) of the standard motion Mi is reduced by a certain amount from the maximum speed, and then returned to the maximum speed to create the second region Mij(2). The decrease and increase of the pressing speed can be determined according to the capacity of the press device 5. Also, the extent to which the pressing speed is reduced can be determined by the length of the cycle time and the increase or decrease in the pressing speed. The point at which the pressing speed begins to decrease within the range of the second region Mi1(2) is preferably subsequent to the point at which the slide has risen high enough that there is no risk of interference with the feeder device (conveyance region R1).

In the second region Mij(2), as shown in FIG. 6, the position of the slide 11 gently approaches top dead center, but since the pressing speed is being changed, the approach does not have to be gentle.

In this way, derivative motions Mij and derivative programs Pij for executing slide speed changes are created for the number of set creation conditions.

Next, in step S50, the transmitting section 36 transmits the derivative motions Mij (j=1 to m) to the line control device 4 in association with the die set (i).

The transmitted derivative motions Mij are stored as derivative programs Pij in the program storage memory 42 of the line control device 4, and are also transmitted from the transmitting section 46 to the press control device 20 and stored in the program storage memory 22.

Operation of Press Line

The line control device 4 transmits synchronization signals to the plurality of press devices 5*a*, 5*b*, 5*c*, and 5*d* and the plurality of feeder devices 6*a*, 6*b*, 6*c*, 6*d*, and 6*e* for synchronization.

Figure 8A:
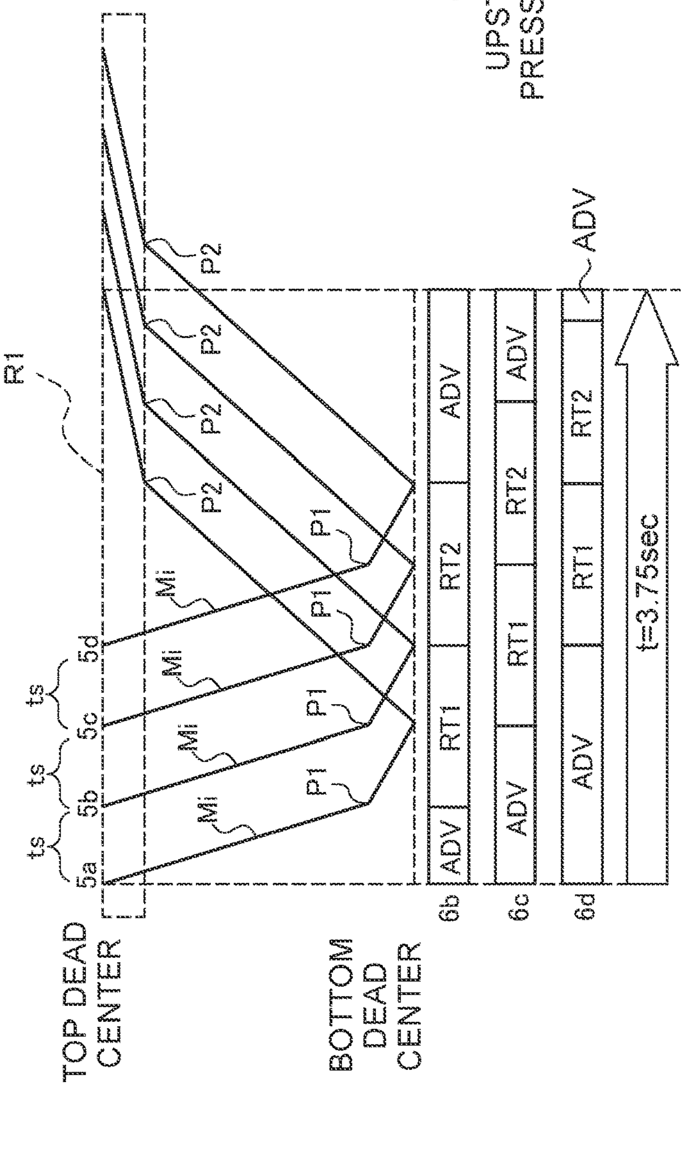
FIG. 8A is a diagram showing the relation between the operation of the press device and the operation of the feeder device in the press system in an embodiment of the present disclosure.
Figure 8B:
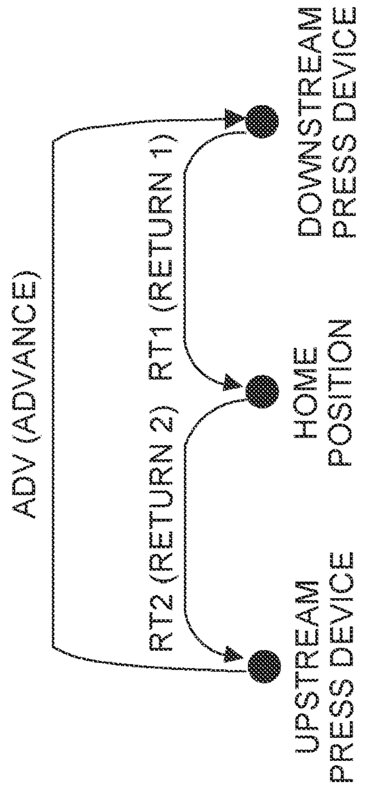
FIG. 8B is a schematic side view illustrating the operation of the feeder device.

FIG. 8A is a diagram showing the relation between the operation of the press devices 5*a*, 5*b*, 5*c*, and 5*d* and the operation of the feeder devices 6*b*, 6*c*, and 6*d*. FIG. 8B is a schematic side view illustrating the operation of the feeder devices 6.

As shown in FIG. 8B, the home position is the intermediate position between the upstream position and the downstream position in the conveyance direction X. The operation of moving the conveying bar 68 from the home position to a position on the upstream side is called an RT2 (return 2) operation, the operation of conveying the workpiece W from a position on the upstream side to a position on the downstream side is called an ADV (advance) operation, and the operation of moving the conveying bar 68 from a position on the downstream side to the home position is called an RT1 (return 1) operation.

In the case of the feeder device 6*a*, the "position on the upstream side" is the loading position of the workpiece W conveyed by a belt conveyor, for example, and in the case of the feeder devices 6*b*, 6*c*, 6*d*, and 6*e*, it is the position of the die of the press device 5 on the upstream side. Also, in the case of the feeder device 6*e*, the "position on the downstream side" the unloading position of a product for conveyance by a conveyor belt, for example, and in the case of the feeder devices 6*a*, 6*b*, 6*c*, and 6*d*, it is the position of the die of the press device 5 on the downstream side.

Thus, the feeder devices 6 repeat the RT2 operation, ADV operation, and RT1 operation.

The press devices 5*a*, 5*b*, 5*c*, and 5*d* and the feeder devices 6*b*, 6*c*, 6*d*, and 6*e* are synchronized by being actuated with a specific time difference from the actuation timing of the feeder device 6*a* that is farthest upstream. For example, the slides 11 of the press devices 5*a*, 5*b*, 5*c*, and 5*d* start moving from top dead center toward bottom dead center at specific intervals from the timing when the feeder device 6*a* starts moving from the home position. Also, the feeder devices 6*b*, 6*c*, 6*d*, and 6*e* start moving in that order at specific intervals from the timing when the feeder device 6*a* starts moving from the home position.

Therefore, the press devices 5*a*, 5*b*, 5*c*, and 5*d* and the feeder devices 6*b*, 6*c*, 6*d*, and 6*e* are each driven at a specific time difference.

FIG. 8A is a diagram showing the relation between the operation of the press devices 5*a*, 5*b*, 5*c*, and 5*d* and the feeder devices 6*b*, 6*c*, and 6*d* in a motion of 16 SPM, for example. At 16 SPM, the cycle time ti of the press device 5 is 3.75 sec.

The standard motions Mi of the press devices 5*a*, 5*b*, 5*c*, 5*d* are shown. The timing of the drive of the press devices 5*a*, 5*b*, 5*c*, and 5*d* from top dead center toward bottom dead center is set to a specific interval ts.

Also, FIG. 8A shows the conveyance region R1. The conveyance region R1 indicates a region near top dead center of the slide 11. When the workpiece W is conveyed between press devices 5, the workpiece W is taken out and put in place when the slide 11 of the press device 5 is disposed near top dead center.

For example, the feeder device 6*b* that conveys the workpiece W from the press device 5*a* to the press device 5*b* takes the workpiece W out of the press device 5*a* near where the press device 5*a* has passed bottom dead center and reached the conveyance region R1, and disposes the workpiece W in the press device 5*b* before the press device 5*b* moves from top dead center toward bottom dead center and falls below the conveyance region R1.

The position at which the slide 11 reaches the conveyance region R1 is shown as P2. The conveyance region R1 is set within a height range of the slide 11 with which the press devices 5 and the feeder devices 6 will not interfere with each other.

Since the feeder device 6*b* is disposed between the press device 5*a* and the press device 5*b*, the relation between the operations of the three devices is such that, as shown in FIG. 8A, when the slide 11 of the press device 5*a* reaches a specific position P1 somewhere between top dead center and bottom dead center, the slide 11 of the press device 5*b* starts moving from top dead center toward bottom dead center, and the feeder device 6*b* ends its ADV operation and starts the RT1 operation. At this point, since the position of the slide 11 of the press device 5*b* is within the conveyance region R1 (near top dead center), there is no interference even when the feeder device 6*b* places the workpiece W in the press device 5*b* on the downstream side.

Next, when the slide 11 of the press device 5*a* reaches bottom dead center, the slide 11 of the press device 5*b* reaches the position P1 and the feeder device 6*b* performs the RT1 operation.

Next, when the slide 11 of the press device 5*b* reaches bottom dead center, the slide 11 of the press device 5*a* is moving from bottom dead center to top dead center, and the feeder device 6*b* ends its RT1 operation and starts the RT2 operation.

Next, when the slide 11 of the press device 5*a* reaches the position P2, the slide 11 of the press device 5*b* is moving from bottom dead center toward top dead center, and the feeder device 6*b* ends its RT2 operation and starts the ADV operation. At this point, since the position of the slide 11 of the press device 5*a* is within the conveyance region R1 (near top dead center), there is no interference even when the feeder device 6*b* takes the pressed workpiece W out of the press device 5*a*.

Next, when the slide 11 of the press device 5*a* reaches top dead center, the cycle described above is repeated.

In this way, the start timing of the operation of the feeder device 6*b* is matched to the motions of the press device 5*a* on the upstream side and the press device 5*b* on the downstream side. More specifically, the timing at which the feeder device 6*b* ends the ADV operation and starts the RT1 operation is the same as the timing at which the slide 11 of the press device 5*a* reaches the position P1. The timing at which the feeder device 6*b* ends the RT1 operation and starts the RT2 operation is the same as the timing at which the slide 11 of the press device 5*b* reaches bottom dead center. The timing at which the feeder device 6*b* ends the RT2 operation and starts the ADV operation is the same as the timing at which the slide 11 of the press device 5*a* reaches the position P2.

The relation between the operations of the press device 5*a*, the feeder device 6*b*, and the press device 5*b* described above is the same as the relation between the operations of the press device 5*b*, the feeder device 6*c*, and the press device 5*c*, and the relation between the operations of the press device 5*c*, the feeder device 6*d*, and the press device 5*d*.

Thus, the feeder devices 6 operate on the basis of the motions of the press devices 5 on the upstream and downstream sides.

Figure 9A:
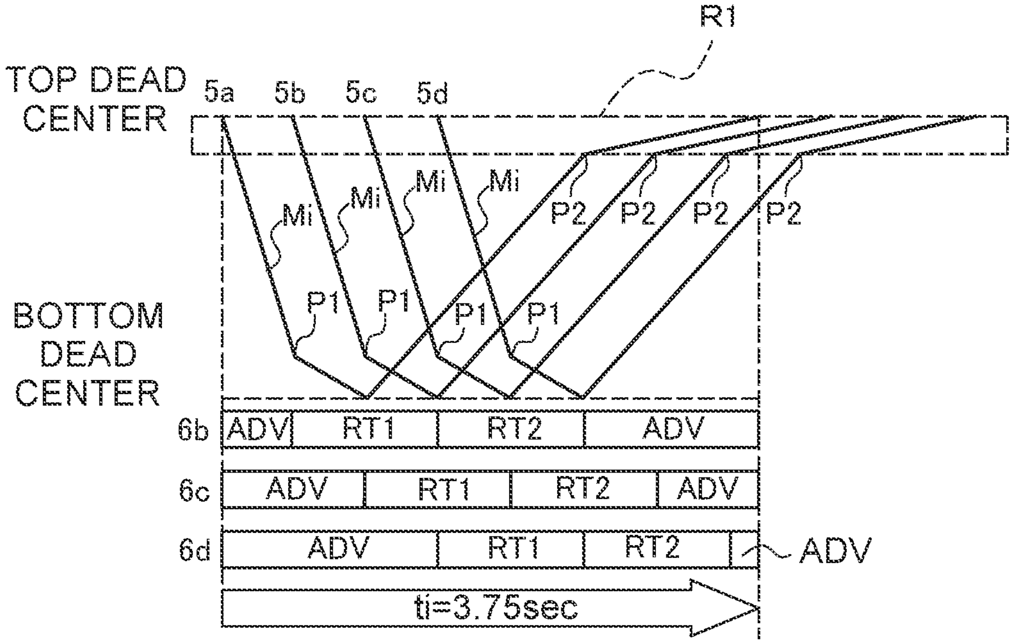
FIG. 9A is a diagram showing the relation between the operations of the press device and the feeder device in standard motion.
Figure 9B:
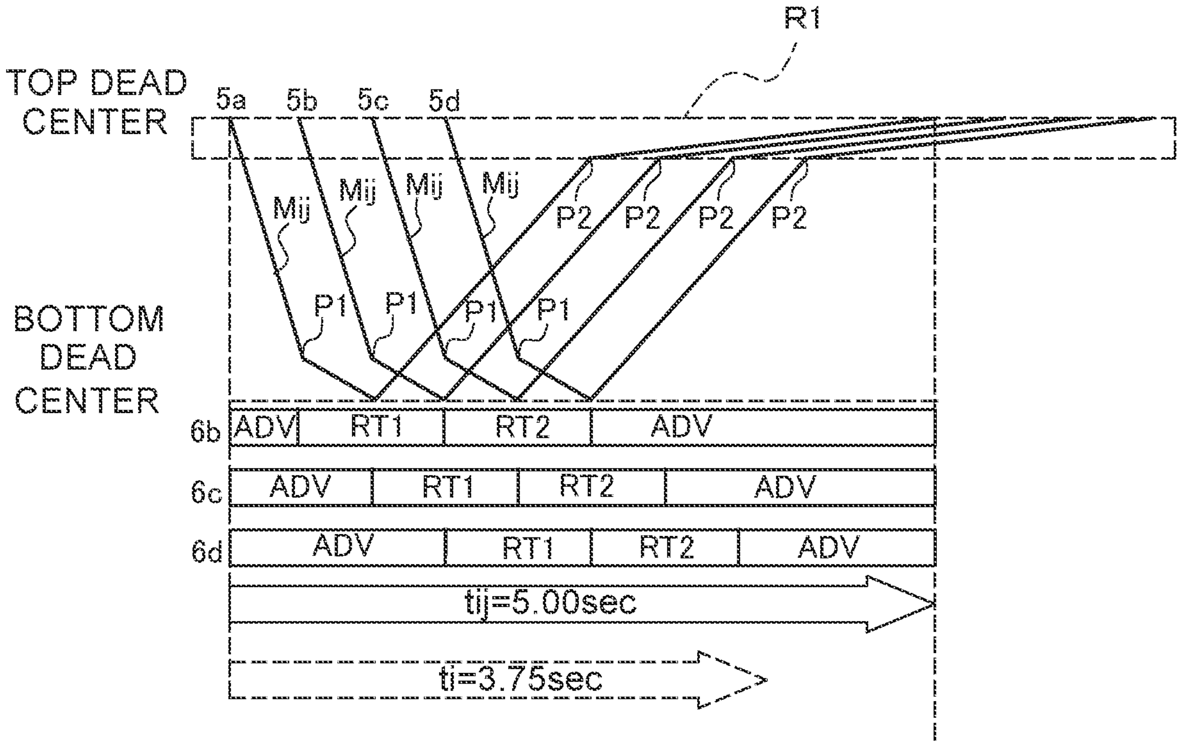
FIG. 9B is a diagram showing the relation between the operations of the press device and the feeder device in derivative motion.

FIG. 9A is a diagram showing the relation between the operations of the press devices 5*a*, 5*b*, 5*c*, and 5*d* and the feeder devices 6*b*, 6*c*, and 6*d* in the same standard motion Mi of 16 SPM as in FIG. 8A. FIG. 9B is a diagram showing the relation between the operations of the press devices 5*a*, 5*b*, 5*c*, and 5*d* and the feeder devices 6*b*, 6*c*, and 6*d* in derivative motions Mij of 12 SPM. At 12 SPM, the cycle time tij of the press devices 5 is 5.00 sec.

FIG. 9B shows the derivative motions Mij. As shown in FIG. 6, the derivative motions Mij are created such that the first region thereof is the same as the first region of the standard motions Mi. In the derivative motions Mij in FIG. 9B, the duration in which the slide 11 is positioned near top dead center, which is the conveyance region R1, is set longer than in the standard motions Mi. The derivative motions Mij shown in FIG. 9B are an example in which the pressing speed begins to decrease after the point at which the slide 11 has risen to a height where there is no risk of interference with the feeder devices 6 within the range of the second region Mij(2).

Even when the motions of the press devices 5*a*, 5*b*, 5*c*, and 5*d* are changed to the derivative motions Mij in order to reduce the SPM value of the press line 2, the motion of the slide 11 from top dead center to the position P2 (the position where the conveyance region R1 is reached) is the same as in the standard motions Mi.

As discussed above, the timing of the operations of the feeder devices 6*b*, 6*c*, and 6*d* is matched with the motion of the slide 11 from top dead center of the press devices 5 on the upstream and downstream sides to the position P2 (the position at which the conveyance region R1 is reached).

Therefore, even when the motion of the press devices 5 is changed from the standard motions Mi to the derivative motions Mij, interference with the press devices 5 can be avoided simply by reducing the speed of the ADV operation of the feeder devices 6, so the SPM of the press line 2 can be reduced without a major change to the program.

In FIG. 9B, the derivative motions Mij are set to the same motions as the standard motions Mi from top dead center, past bottom dead center, and on to the position P2, but this is not the only option, and only the motions from top dead center to the end of the molding region may be made the same.

In this case, described in terms of the relation between the operations of the press device 5*a*, the feeder device 6*b*, and the press device 5*b*, since time it takes for the slide 11 of the press device 5*a* to reach the position P2 from top dead center varies, it may be necessary to change the timing at which the feeder device 6*b* ends its RT2 operation and begins its ADV operation for some press lines.

In this case, it is necessary to change the program of the timing at which the feeder devices 6 ends the RT2 operation and starts the ADV operation, but the timing at which the feeder devices 6 ends the ADV operation and starts the RT1 operation, and the timing at which the feeder devices 6 ends the RT1 operation and starts the RT2 operation are the same as for the standard motions Mi.

Accordingly, when the motion from top dead center to the end position of the molding region is made the same as the standard motions Mi, there will be more changes to the program for changing the start timing of the ADV operation than when the motion from top dead center to the position P2 is made the same as the standard motions Mi, as shown in FIG. 9B. However, when the motion from top dead center to the end position of the molding region is made the same as the standard motions Mi, compared to when the motion from top dead center to the end position of the molding region is changed, there will be no need to change the start timing of the RT1 operation and the start timing of the RT2 operation, so fewer program changes are required. That is, even when only the motion from top dead center to the end position of the molding region is made the same as the standard motions Mi, the speed of the press line 2 can be changed with just a small program change.

Features, etc.

The motion generation device 3 of this embodiment is a motion generation device for generating motion of a slide 11 of a press device 5 comprising a slide 11 to which an upper die 7*a* is attached, a bolster 12 on which a lower die 7*b* is placed, and a servomotor 15 that operates the slide 11 reciprocally in an up and down direction, said motion generation device comprising a motion generation section 32. The motion generation section 32 generates a derivative motion Mim (an example of a second motion) of the slide 11 at a cycle time Tm (an example of a second cycle time) different from a cycle time TStd (an example of a first cycle time) of a standard motion Mi (an example of a first motion) of the slide 11, such that the derivative motion Mim includes the same motion as a first region Mi(1) (an example of a specific portion) of the standard motion Mi including at least from top dead center to an end position of a molding region, and a speed of the slide 11 at top dead center of the derivative motion Mim is the same as a speed of the standard motion Mi.

When generating a derivative motion Mim with a different cycle time from that of a preset standard motion Mi so that the operations of the press device 5 and the feeder device 6 do not interfere with each other, the range from top dead center to bottom dead center is set to the same motion as the standard motion Mi.

Consequently, when the press device 5 is moved by the derivative motion Mim, the time difference between the press devices 5 and the feeder devices 6 can be kept the same as in the standard motion Mi, although a small program change may be required, which means that interference between the press devices 5 and the feeder devices 6 can be avoided.

Therefore, the speed of the press line 2 can be easily changed without needing any major program change or the like for the entire press line 2.

Also, since the motion in the molding region of the derivative motion Mim is the same as the motion in the molding region of the standard motions Mi, even when the motion is changed to change the cycle time, the same molding accuracy can be maintained as in the standard motions Mi.

The above makes it easy to change the speed of the press line while maintaining the molding accuracy.

Also, when a derivative motion Mim is created so that the speed of the slide 11 at top dead center is the same as the speed in the standard motions Mi, there will be no need to increase the speed so as to match the speed of the standard motions Mi between top dead center and bottom dead center, so motion from top dead center to bottom dead center of the standard motions Mi can also be realized in the derivative motion Mim.

In addition, when the speed at the time of reaching top dead center in the derivative motion Mim is left decreased, without matching it to the speed of the standard motions Mi, it will be necessary to increase the speed when moving from top dead center toward bottom dead center, so the motion from top dead center to bottom dead center will change as compared to the standard motions Mi.

Figure 10:
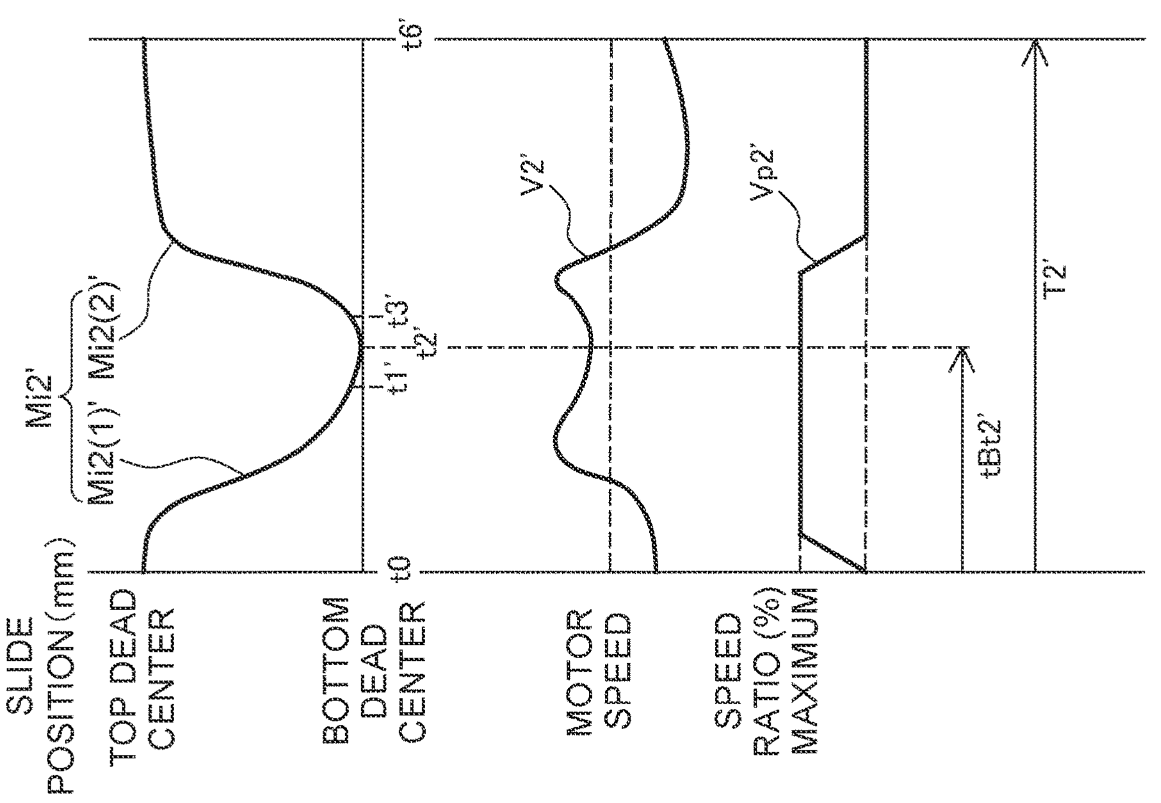
FIG. 10 is a diagram showing the derivative motion when the speed has been reduced without matching the speed upon reaching top dead center with the speed of standard motion.

FIG. 10 is a diagram showing a derivative motion Mi2' in which the speed when reaching top dead center is left decreased, without being matched to the speed of the standard motions Mi. As shown by the motor speed VT and the speed ratio Vp2', with the derivative motion Mi2', the motor speed VT remains decreased in the second region Mi2(2)', unlike the derivative motion Mi2 described with reference to FIG. 6, and speed remains decreased even at top dead center (time t6').

Therefore, when moving from top dead center (time t0) toward bottom dead center, it becomes necessary to increase the motor speed so as to match the speed of the standard motions Mi, the time t2' upon reaching bottom dead center becomes later than t2, and the duration tBt2' from top dead center to bottom dead center also becomes later than the duration tBt2. Similarly, the times t1' to t3' in the molding region are later than the times t1 to t3.

Thus, a derivative motion is created to change the speed of the press line 2, but when the motion of the portion including from top dead center to the end position of the molding region in the derivative motion changes compared to the standard motions, it may be impossible to handle this merely by lengthening the advance time of the feeder devices 6, and it may be necessary to change the program of the entire press line 2.

By contrast, the derivative motion Mim generated by the motion generation device 3 in this embodiment is the same as the standard motions Mi in terms of the motion portion including from top dead center to the end position of the molding region, so while it may be necessary to make a small program change as discussed above, the speed of the press line 2 can be changed while keeping the time difference between the press devices 5 and the feeder devices 6 the same as in a standard motion.

With the motion generation device 3 in this embodiment, the cycle time Tm (an example of the second cycle time) is longer than the cycle time TStd (an example of the first cycle time). The motion generation section 32 decreases the speed of the servomotor 15 in the portion other than the first region Mi(1) (an example of the specific portion) of the standard motion Mi (an example of the first motion), thereby generating the derivative motion Mim (an example of the second motion).

Operating the press device 5 by using the derivative motion Mim generated in this way allows the cycle time to be lengthened, that is, the SPM (shot per minute) to be reduced.

With the motion generation device 3 in this embodiment, the cycle time Tm is longer than the cycle time TStd. As described with reference to FIG. 6, the motion generation section 32 generates the derivative motion Mim by reducing the speed below the speed of the slide 11 and then returning to the same speed as the standard motion Mi by the time top dead center is reached in the portion of the standard motion Mi other than the first region Mim(1) (an example of the specific portion).

This makes it possible to lengthen the time of the portion of the standard motion Mi other than the portion from top dead center to bottom dead center. Therefore, it is possible to generate a derivative motion Mim having a longer cycle time than the standard motion Mi.

With the motion generation device 3 in this embodiment, the first region Mim(1) (an example of the specific portion) includes a range (conveyance region R1) from top dead center until reaching a height of the slide 11 that does not interfere with the feeder devices 6 that convey or unload the workpiece W to or from the press device 5. The motion generation section 32 generates a derivative motion Mim (an example of the second motion) so that the speed of the slide 11 is reduced below that of the standard motions Mi (an example of the first motion) within the range of the slide 11 over which there is no interference.

Consequently, the SPM of the press line 2 can be easily changed simply by extending the ADS operation time of the feeder devices 6, as shown in FIG. 9B.

The press device 5 in this embodiment is a press machine that presses a workpiece W using an upper die 7*a* and a lower die 7*b*, and comprises a slide 11, a bolster 12, a servomotor 15, a program storage memory 22 (an example of a storage section), and a press control section 21 (an example of the control section). The upper die 7*a* is attached to the slide 11. The lower die 7*b* is placed on the bolster 12. The servomotor 15 moves the slide 11 reciprocally in an up and down direction. The program storage memory 22 stores a derivative motion Mim (an example of the second motion) at a cycle time different from a cycle time TStd of a standard motion Mi (an example of the first motion) of the slide 11, such that the derivative motion Mim includes the same motion as a first region Mi(1) (an example of the specific portion) of the standard motion Mi including at least from top dead center to an end position of a molding region, and a speed of the slide 11 at top dead center of the derivative motion Mim is the same as a speed of the standard motion Mi. The press control section 21 drives the servomotor 15 so that the slide 11 moves in the derivative motion Mim.

When generating a derivative motion Mim having a cycle time different from that of the standard motion Mi which is set in advance so that the operations of the press devices 5 and the feeder devices 6 do not interfere with each other, the range from top dead center to bottom dead center is set to the same motion as the standard motion Mi.

Consequently, when the press device 5 is moved at the derivative motion Mim, a small program change may be necessary, but the time difference between the press devices 5 and the feeder devices 6 can be kept the same as in the standard motion Mi, allowing interference between the press devices 5 and the feeder devices 6 to be avoided.

Therefore, the speed of the press line 2 can be easily changed without requiring a major program change or the like for the entire press line 2.

The motion generation method of this embodiment is a motion generation method for generating a motion of a slide 11 of a press device 5 comprising a slide 11 to which an upper die 7*a* is attached, a bolster 12 on which a lower die 7*b* is placed, and a servomotor 15 that moves the slide 11 reciprocally in an up and down direction, said method comprising a step S40 (an example of a motion generation step). Step S40 involves generating a derivative motion Mim (an example of a second motion) of the slide 11 at a cycle time Tm (an example of a second cycle time) different from the cycle time TStd (an example of a first cycle time) of a standard motion Mi (an example of a first motion) of the slide 11, such that the derivative motion Mim includes the same motion as a first region Mi(1) (an example of a specific portion) of the standard motion including at least from top dead center to the end position of the molding region, and a speed of the slide 11 at top dead center of the derivative motion Mim is the same as a speed of the standard motion Mi.

When generating the derivative motion Mim having a different cycle time from that of the standard motion Mi set in advance so that the operations of the press devices 5 and the feeder devices 6 do not interfere with each other, the range from top dead center to bottom dead center is set to be the same motion as the standard motion Mi.

As a result, when the press devices 5 are moved at the derivative motion Mim, a minor program change may be required, but the time difference between the press devices 5 and the feeder devices 6 can be kept the same as in the standard motion Mi, so interference between the press devices 5 and the feeder devices 6 can be avoided.

Therefore, the speed of the press line 2 can be easily changed without the need for a major program change or the like for the entire press line 2. As discussed above, the point at which the pressing speed starts to decrease is preferably after the point at which the slide has risen to a height where there is no risk of interference with the feeder device. Consequently, the derivative motion Mim perfectly matches the standard motion Mi in the period from top dead center to said point in time, and interference between the slide and the feeder device can be more reliably avoided, without having to perform a program change or the like for the entire press line 2.

An embodiment of the present invention was described above, but the present invention is not limited to the above embodiment, and various modifications are possible without departing from the gist of the invention. In particular, the embodiments and modification examples described in this Specification can be combined as needed.

In the above embodiment, a tandem press line 2 was described, but the press line is not limited to a tandem type, and may instead be a transfer press line. With a transfer press line, a plurality of upper dies 7*a* and lower dies 7*b* are disposed in a single press device 5, and workpieces W are sequentially conveyed from an upstream die to a downstream die by a transfer feeder.

With a transfer press machine as well, the speed of the press line can be easily changed by generating a derivative motion so that the motion from top dead center to bottom dead center is the same as the standard motion.

Figure 11:
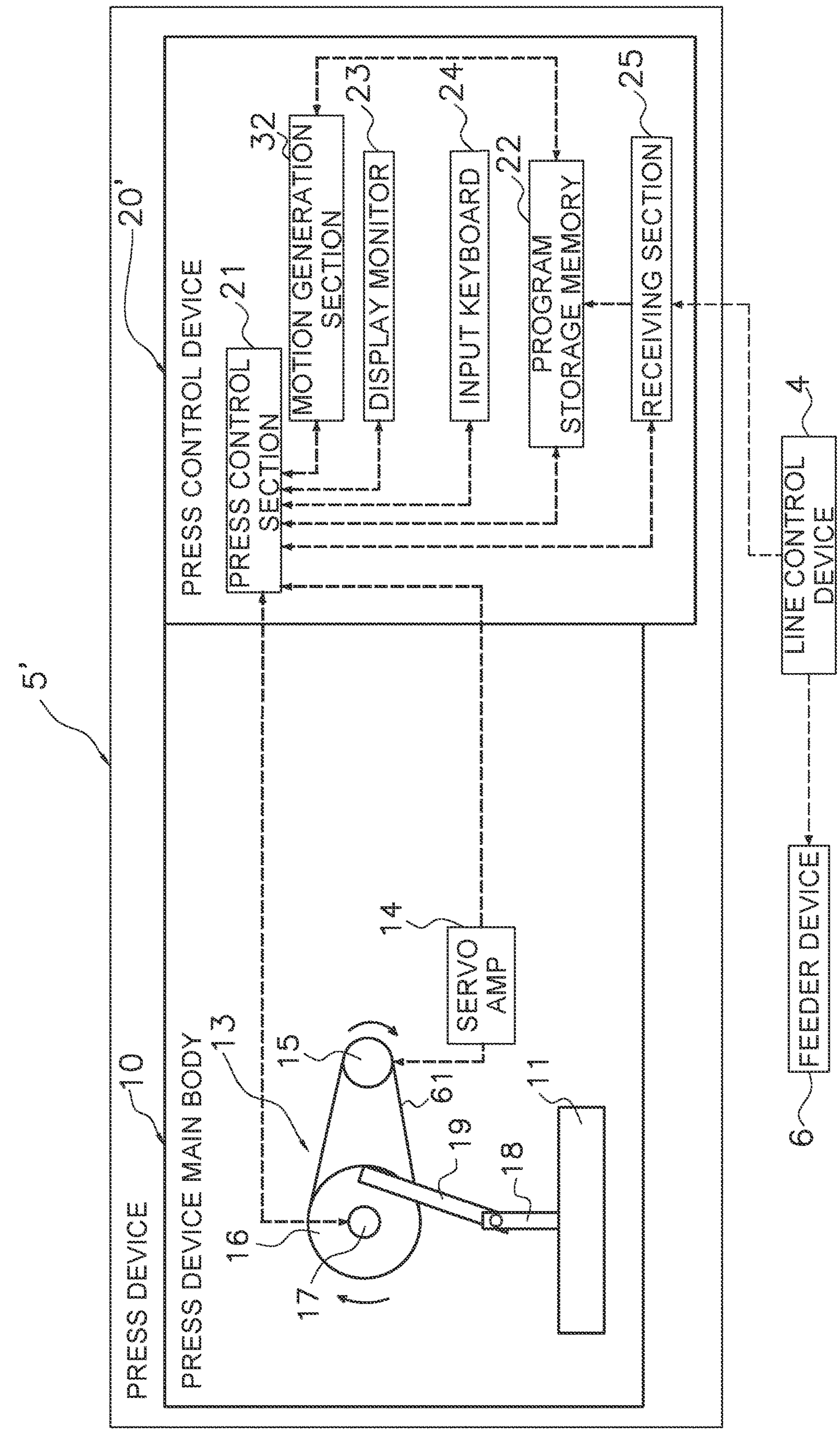
FIG. 11 is a diagram showing the configuration of the press device in a modification example of an embodiment of the present disclosure.

The motion generation device 3 was provided separately from the press devices 5 in the above embodiment, but the motion generation device 3 may instead be incorporated into the press devices 5. FIG. 11 is a diagram showing a configuration in which a motion generation section 32 is provided in a press control device 20' of a press device 5'.

In the above embodiment, the feeder devices 6 were given as an example of a conveyance device, but the present invention is not limited to this, and may be a conveyer or the like, so long as it is a conveyance device that is disposed in a line including a press device.

In the above embodiment, the derivative motions Mij (j=1 to m) were created such that the first region Mim(1) thereof was the same motion as the first region Mi(1) of the standard motion Mi, but what is important is that at least the motion from top dead center to bottom dead center be the same. This allows the speed of the press line to be easily changed.

In the above embodiment, the standard motion Mi was set to the motion of the slide 11 at the maximum SPM in the specifications, but this is not the only option, and the motion may not be at the maximum SPM.

In the above embodiment, the derivative motions Mij (j=1 to m) created by the motion generation device 3 had a smaller SPM than the standard motions Mi, but this is not the only option. For example, when the standard motion Mi is not a motion with the maximum SPM in the specifications, a derivative motion Mij (j=1 to m) having a larger SPM than the standard motion Mi may be created.

In the above embodiment, in the second region Mij(2) (j=1 to m) of the derivative motion Mij (j=1 to m), the motor speed was compared with the motor speed of the standard motion Mi and reduced once, and then increased once to bring the speed to the same speed as the standard motion Mi in reaching top dead center, but this is not the only option. For example, in the second region Mij(2), the increase and decrease of the motor speed may be repeated a plurality of times, or the speed may be increased and decrease in steps. In short, what is important is that the speed of the motor upon reaching top dead center in the derivative motion Mij be the same as the speed of the motor in the standard motion Mi.

In the above embodiment, the derivative program Pij (j=1 to m) for executing the derivative motion Mij (j=1 to m) was first transmitted to the line control device 4, and then stored in the press device 5 from the line control device 4, but may instead be transmitted directly to the press device 5 without going through the line control device 4.

A crank mechanism was used as the slide drive section 13 in the above embodiment, but a link mechanism may be used instead.

The motion generation device disclosed herein has the effect of allowing the speed of a press line to be easily changed, and is useful as a tandem press, transfer press, or the like that is used for sheet metal processing.

The invention claimed is:

1. A motion generation device configured to generate motion of a slide of a press device including a slide to which an upper die is attached, a bolster on which a lower die is placed, and a servomotor configured to move the slide reciprocally in an up and down direction, the motion generation device comprising:

a motion generation section including a processor, the motion generation section being configured to generate a second motion of the slide at a second cycle time different from a first cycle time of a first motion of the slide, such that the second motion includes the same motion as a specific portion of the first motion including at least from top dead center to an end position of a molding region, and a speed of the slide at top dead center of the second motion is the same as a speed of the first motion, the second cycle time being longer than the first cycle time, and the motion generation section being configured to generate the second motion by reducing the speed of the slide in a portion other than the specific portion to be lower than that of the first motion.

2. The motion generation device according to claim 1, wherein the motion generation section is configured to generate the second motion by reducing the speed of the slide below the speed of the slide in the first motion and returning the speed to be the same as in the first motion until top dead center is reached in the portion other than the specific portion.

3. The motion generation device according to claim 1, wherein the specific portion includes a range from top dead center until reaching a height of the slide that does not interfere with a feeder device configured to convey a workpiece into or out of the press device, and the motion generation section is configured to generate the second motion such that the speed of the slide is lower than that of the first motion within the range of the slide that does not interfere.

4. A press device for pressing a workpiece using an upper die and a lower die, the press device comprising:

a slide to which the upper die is attached;

a bolster on which the lower die is placed;

a servomotor configured to move the slide reciprocally in an up and down direction;

a storage configured to store a second motion of the slide at a second cycle time different from a first cycle time of a first motion of the slide, such that the second motion includes the same motion as a specific portion of the first motion including at least from top dead center to an end position of a molding region, and a speed of the slide at top dead center of the second motion is the same as a speed of the first motion; and a control section including a processor, the control section being configured to drive the servomotor so that the slide moves in the second motion, the second cycle time being longer than the first cycle time, and the second motion being generated by reducing the speed of the slide in a portion other than the specific portion to be lower than that of the first motion.

5. The press device according to claim 4, further comprising a motion generation section that includes a processor and is configured to generate the second motion.

6. A motion generation method for generating a motion of a slide of a press device comprising a slide to which an upper die is attached, a bolster on which a lower die is placed, and a servomotor configured to move the slide reciprocally in an up and down direction, the motion generation method comprising:

a motion generation step of generating a second motion of the slide at a second cycle time different from a first cycle time of a first motion of the slide, such that the second motion includes the same motion as a specific portion of the first motion including at least from top dead center to an end position of a molding region, and a speed of the slide at top dead center of the second motion is the same as a speed of the first motion, the second cycle time is longer than the first cycle time, and the second motion being generated by reducing the speed of the slide in a portion other than the specific portion to be lower than that of the first motion.

* * * * *